(12) United States Patent
Dalsgaard et al.

(10) Patent No.: US 10,571,088 B2
(45) Date of Patent: Feb. 25, 2020

(54) COLOR FILTER PAIR WITH COMB-LIKE FILTER CHARACTERISTICS HAVING NON-PARALLEL TEETH

(71) Applicant: Harman Professional Denmark ApS, Aarhus N (DK)

(72) Inventors: Carsten Dalsgaard, Silkeborg (DK); Jesper Gadegaard, Tilst (DK)

(73) Assignee: HARMAN PROFESSIONAL DENMARK APS., Aarhus (DK)

( * ) Notice: Subject to any disclaimer, the term of this patent is extended or adjusted under 35 U.S.C. 154(b) by 0 days.

(21) Appl. No.: 16/129,728

(22) Filed: Sep. 12, 2018

(65) Prior Publication Data

US 2019/0078742 A1    Mar. 14, 2019

(30) Foreign Application Priority Data

Sep. 13, 2017 (DK) .................................. 2017 70691

(51) Int. Cl.
| | |
|---|---|
| F21S 10/02 | (2006.01) |
| F21V 9/40 | (2018.01) |
| F21S 10/00 | (2006.01) |
| F21W 131/406 | (2006.01) |

(52) U.S. Cl.
CPC .......... *F21S 10/026* (2013.01); *F21S 10/007* (2013.01); *F21V 9/40* (2018.02); *F21W 2131/406* (2013.01)

(58) Field of Classification Search
CPC .............................. F21S 10/026; F21S 10/007
USPC ...................................................... 362/293
See application file for complete search history.

(56) References Cited

U.S. PATENT DOCUMENTS

| | | | | |
|---|---|---|---|---|
| 4,368,974 A | * | 1/1983 | Coote | G02B 5/20 355/35 |
| 5,590,954 A | * | 1/1997 | Hanson | F21V 9/40 362/321 |
| 6,241,366 B1 | * | 6/2001 | Roman | F21V 11/18 362/293 |
| 6,687,063 B1 | * | 2/2004 | Rasmussen | F21S 10/007 359/887 |
| 2003/0072161 A1 | * | 4/2003 | Hough | F21V 5/008 362/293 |
| 2009/0231854 A1 | | 9/2009 | Jurik | |

(Continued)

FOREIGN PATENT DOCUMENTS

| | | |
|---|---|---|
| EP | 1158239 A1 | 11/2001 |
| WO | 0137032 A2 | 5/2001 |

OTHER PUBLICATIONS

Danish Search Report for Application No. PA 2017 70691, dated Feb. 21, 2018, 5 pages.

*Primary Examiner* — Christopher M Raabe
(74) *Attorney, Agent, or Firm* — Artegis Law Group, LLP

(57) ABSTRACT

A filter assembly with a color filter pair for a light fixture comprising two color filters is provided, where the color filters are linear moveable relatively to each other in parallel planes by at least one actuator. Each of the colors filters comprise a color filtering region formed as a comb-like structure comprising plurality of elongated teeth where the elongated teeth of the color filters are angled in relation to the direction of movement of the color filters. Further, the angle between the elongated teeth of the same color filter is less than 10 degrees and the elongated teeth of the two color filters are non-parallel in relation to each other. A light fixture comprising a plurality of such color filter pairs is also described.

19 Claims, 13 Drawing Sheets

(56) References Cited

U.S. PATENT DOCUMENTS

2010/0141903 A1\* 6/2010 Von Preyss ........... F21S 10/007
                                                    353/84
2014/0111999 A1\* 4/2014 Quadri ................. F21S 10/007
                                                    362/293
2019/0219249 A1\* 7/2019 David .................... F21V 5/007

\* cited by examiner

COLOR FILTER PAIR WITH COMB-LIKE FILTER CHARACTERISTICS HAVING NON-PARALLEL TEETH

CROSS-REFERENCE TO RELATED APPLICATIONS

This application claims the priority of co-pending Danish patent application titled, "COLOR FILTER PAIR WITH COMB-LIKE FILTER CHARACTERISTICS HAVING NON-PARALLEL TEETH" filed on Sep. 13, 2017 and having Serial No. PA 2017 70691. The subject matter of this related application is hereby incorporated herein by reference

BACKGROUND

Field of the Invention

The present invention relates to a filter assembly with a color filter pair for a light fixture, where the light fixture comprises at least one light source generating a light beam, which propagates along a primary optical axis and where a plurality of color filters is configured to gradually move into the light beam to change the color and/or the color temperature of the light beam.

Background of the Invention

In order to create various light effects and mood lighting in connection with concerts, live shows, TV shows, sport events or as a part of an architectural installation light fixtures creating various light effects are getting more and more used in the entertainment industry. Typically, entertainment light fixtures create a light beam having a beam width and a divergence and can for instance be wash/flood light fixtures creating a relatively wide light beam or it can be projecting fixtures configured to projecting images onto a target surface.

Typically, the light beam can create a large number of colors for instance by using the techniques of additive color mixing or subtractive color mixing. In additive color mixing light from light sources emitting different colors are mixed together in order to create a mixed light beam where the color of the mixed light beam can be varied by changing the intensity of the light sources in relation to each other. In subtractive color mixing a number of color filters is inserted into the light beam from at least one light source and the color filter subtracts optical wavelengths from the light beam in order to create a certain color. Consequently, in subtractive color mixing a light source emitting white light is often used.

WO0137032 discloses of subtractive color mixing system comprising a plurality of color filter sets, where each set of filters comprises two filters moveable relatively towards and along each other in substantially parallel planes to obtain varying degrees of overlap, and in which the filters in each set have a comblike structure in the coloration and in that the structures are substantially aligned with the direction of movement, and at least one edge of each tooth of the comblike structure comprises a first edge portion at a first acute angle (p) to the direction of relative movement of the filters and a second edge portion at a second acute angle (s) to the direction of relative movement of the filters, and the first and second angles are not equal, such that the teeth of the comblike structure deviate from a simple isosceles triangular shape.

The color mixing system according to the WO0137032 is optimized for light systems where the light beam is provided by a single light source, which is arranged in an elliptic reflector, which is configured to direct the light towards the color mixing system. However, the light mixing system according to WO0137032 does not provide a satisfying color mixing when used in connection with light systems where the light beam is generated by a plurality of light sources for instance light emitting diodes (LED). When used in connection with a plurality of light sources, the color mixing system according to WO0137032 must be very accurately arranged and aligned in relation to the light beam in order to provide sufficient color mixing. This increases the manufacturing costs and time as the color mixing system needs to be very accurately arranged in relation to the light source. Further the light mixing system is less reliable as the color mixing system may be misaligned during lifetime of the light fixture e.g. due to temperature changes, external forces applied to the light fixture e.g. during transportation.

DESCRIPTION OF THE INVENTION

The object of the present invention is to provide a more robust and more tolerant color mixing system, which can be used for a light system comprising a plurality of light sources generating a light beam. The color filter pair as defined by the independent claims can achieve this. The benefits and advantages of the present invention are disclosed in the detailed description and illustrated by the drawings. The dependent claims define different embodiments of the invention.

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have been given the same last two digits. Further similar elements providing similar effect within the same figure may be provided with additional characters such as letters or other signs.

Figure 1A:
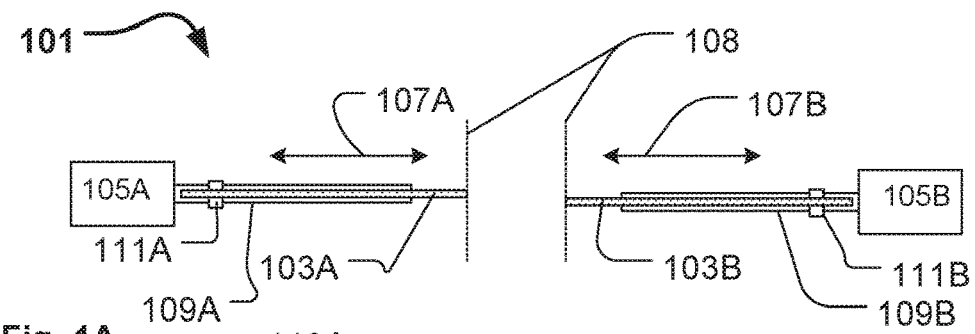
FIGS. 1A, 1B, 1A', 1B', 1A", 1B", 1A''' and 1B''' illustrate a structural view of a color filter pair according to the present invention at different positions of the color filters.
Figure 1B:
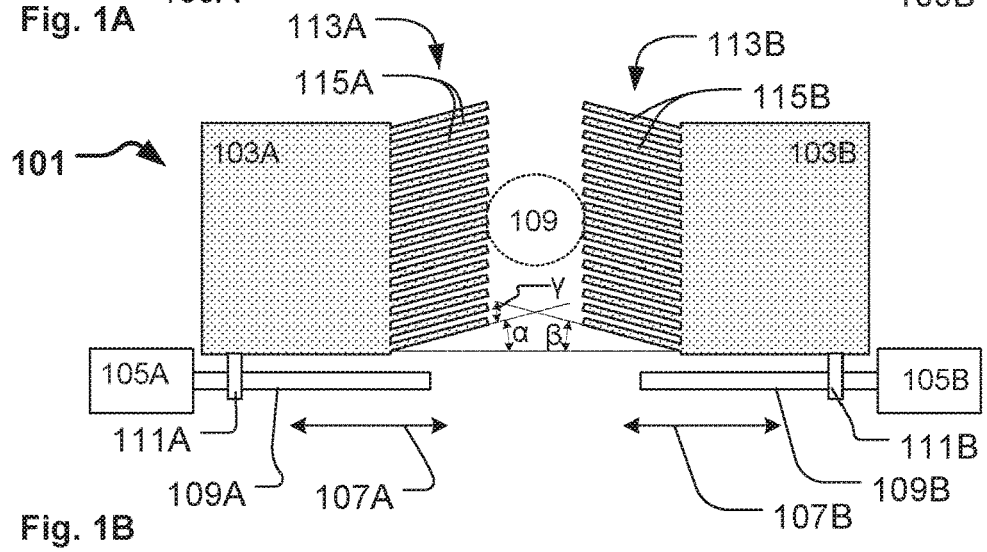
Figure 1A:
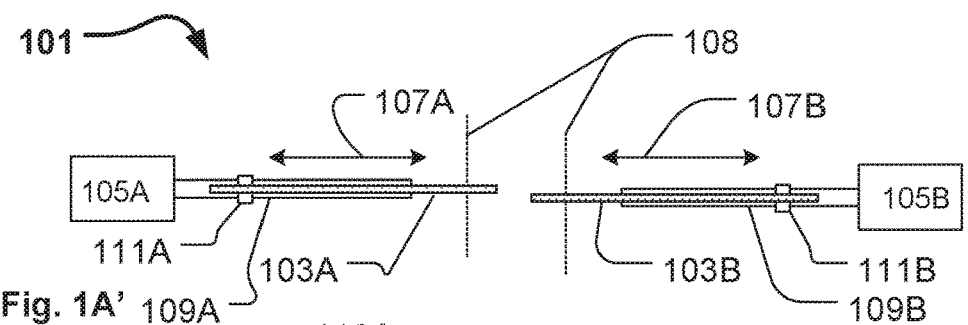
Figure 1B:
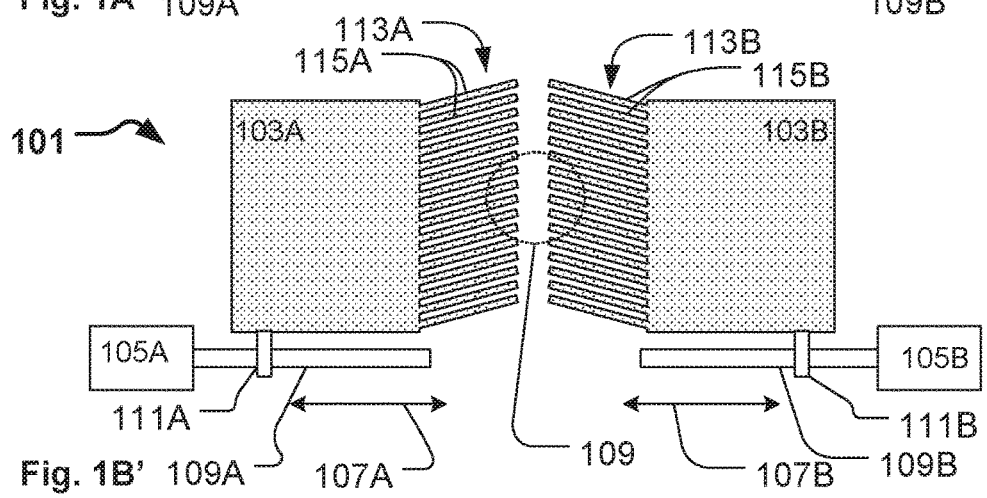
Figure 1A:
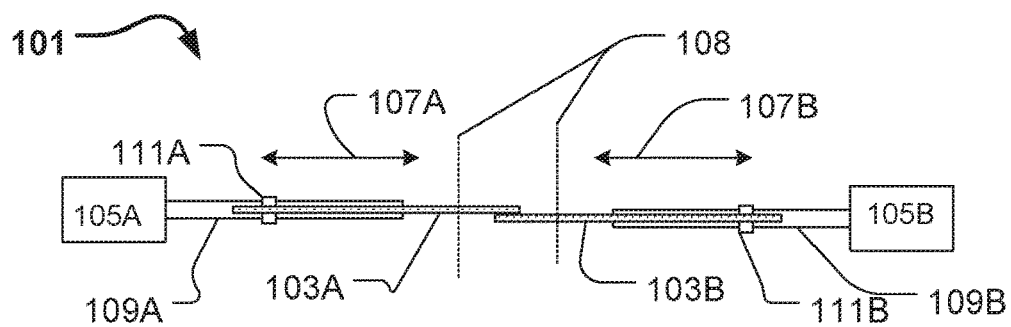
Figure 1B:
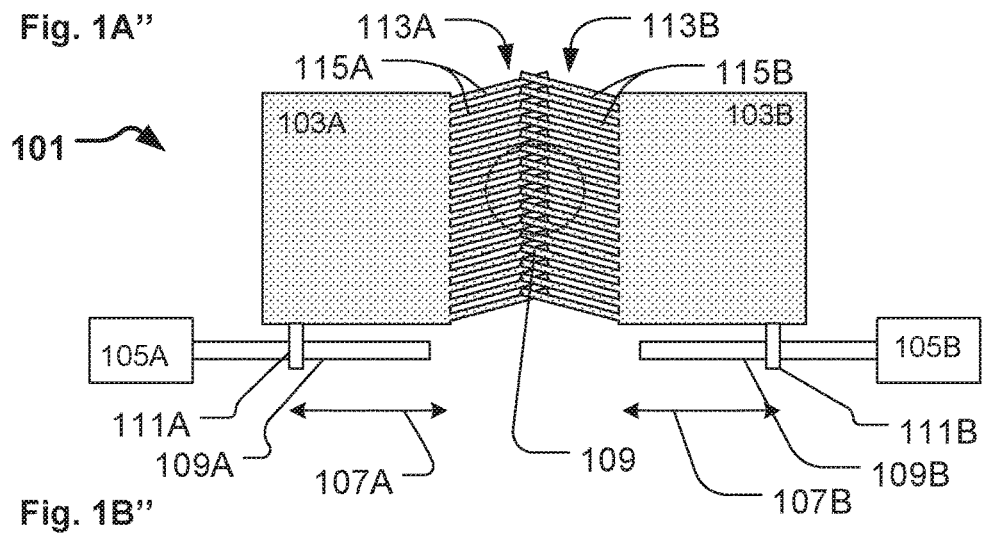
Figure 1A:
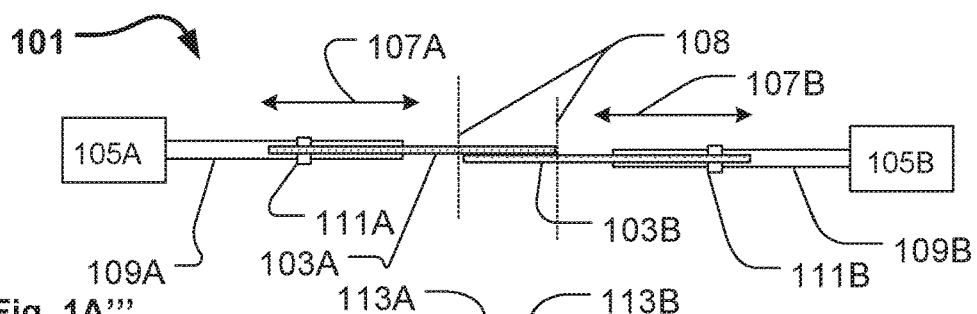
Figure 1B:
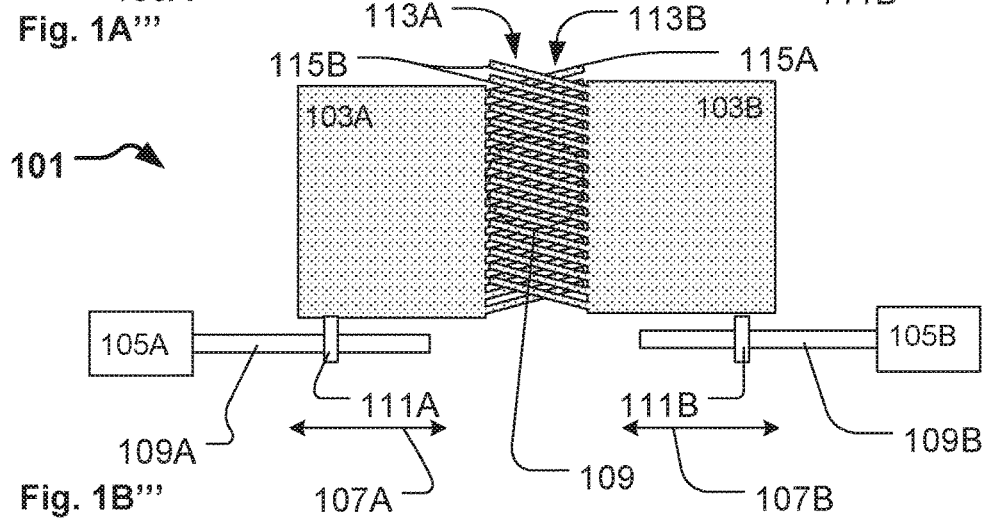

FIGS. 1A, 1A', 1A'', 1A''', 1B, 1B', 1B'' and 1B''' illustrate a structural diagram of a color filter pair 101 for a light fixture according to the present invention, where FIG. 1A, 1A', 1A'' and 1A''' illustrate top views of the color filter pair and illustrate different positions of the color filters 103A, 103B in relation to each other, Similar FIG. 1B, 1B', 1B'' and 1B''' illustrate front views of the color filter pair and illustrate different positions of the color filters 103A, 103B in relation to each other.

The color filter pair comprises two color filters 103A, 103B linear moveable relatively to each other in parallel planes by actuators 105A, 105B, respectively as illustrated by arrows 107A, 107B. In the illustrated embodiment, each of the color filters 103A and 103B is respectively linear moveable by the actuators 105A and 105B and can be inserted into a light beam 108 (indicated by dotted lines). The color filters are linear movable in relation to each other and do thus follow a substantially linear path of translation in relation to each other. In the illustrated embodiment the color filter are arrange at opposite sides of the light beam 108 and the linear translations parts are provided along parallel planes and directed substantially toward each other. Consequently, the color filters 103A and 103B can be inserted into the light beam from opposite sides of the light beam. In addition, the color filters are arranged in substantial parallel planes. In this embodiment, the color filters are arranged offset along the light beam in relation to each other in order to allow partial overlap of the color filters inside the light beam.

In the illustrated embodiment the actuators 105A, 105B comprises a spindle 109A, 109B, which upon rotation moves a threaded attachment mechanism 111A, 111B, which connects a color filter to the spindle and thus moves the color filters along the spindle upon rotation of the spindle. It is to be understood that the illustrated actuators and spindles only illustrate one way of providing a mechanism that can move the color filters along a linear translation path and a person skilled in mechanics will be able to provide many different mechanisms causing the same effect. For instance, by using guiding tracks along which the color filters can move and where a belt drive mechanism moves the color filters along the track. In one embodiment, a single actuator can drive a belt drive mechanism whereby the two color filters are moved synchronously by the actuator. Linear actuators comprising an actuator shaft which is moved in a longitudinal direction by the linear actuator and where the color filter is attached to the actuator shaft can also be provided.

The color filters are provided as substantial plane color filters comprising a color filtering region (illustrated as shaded area) configured to provide a filter effect to the light beam when inserted into the light beam. The filter region can be provided as any material capable of providing a filtering effect to the light beam for instance color gels, dichroic filters or the like.

At least a part of the color filtering regions of each color filter is formed as a comb-like structure 113A, 113B comprising plurality of elongated teeth 115A, 115B. The elongated teeth of the color filters are angled in relation to the direction of movement of the color filters and the angle between the elongated teeth of the same color filter is less than 10 degrees. In another embodiment, the angle between the elongated teeth at the same color filter is less than 5 degrees and in yet another embodiment the angle of the elongated teeth of the same color filter is less than 3 degrees. In FIG. 1B, dotted lines have been provided to illustrate the angle $\alpha$ of the elongated teeth 115A of first color filter 103A and the angle $\beta$ of the elongated teeth of the second color filter 103B. The illustrated elongated teeth 115A of the first color filter 103A have the same angle in relation to the direction of movement and are thus parallel. Similarly the elongated teeth 115B of the second color 103B filter have the same angle in relation to the direction of movement are thus parallel. It is to be understood that the elongated teeth of the same filter may be slightly angled in relation to each other meaning that the angle in relation to the direction of movement of the color filter may be slightly different. The angle between the elongated teeth of the same color filter are thus less than 10 degrees, less than 5 degrees and/or less than 3 degrees in relation to each other.

The elongated teeth of the two color filters are non-parallel in relation to each other, meaning that the angle between the elongated teeth of the two color filters are larger than 0 degrees. In FIG. 1B, the angle between the elongated teeth of the two color filters is illustrated as angle $\gamma$. The angle $\gamma$ between the elongated teeth of the two color filters is defined as the acute angle formed between elongated teeth of the two color filters. However, the angle between the elongated teeth of the two color filters can in one embodiment be a right/even angle. The non-parallel structure of the elongated teeth of the two color filters provides a more robust and reliable color mixing system as the non-parallel teeth are less sensible to misalignments between the color filters. In the prior art, where the elongated teeth are arranged in parallel patterns, a small misalignment between the two color filters in a vertical direction in relation to linear translation path of the color filters results in the fact that additional open areas occur between the elongated teeth. This results in the fact that less light is provided with the filter effect of the color filters and thereby it is not possible to control the color mixing. By providing the elongated teeth of the two color filters as non-parallel teeth reduces this effect, as misalignment of non-parallel elongated teeth in the vertical direction in relation to the linear translation path do not result in additional open areas as the non-parallel elongated teeth can be moved vertically in relation to each other without creating additional open areas. Further in light fixtures where a plurality of light sources such as LEDs generate the light in additional openings may also occur between the parallel elongated teeth of the prior art color filters. This is due to the fact that the plurality of light sources emit light from different positions and at different angles in relation to the color filters. This effect can also be avoided by providing the two color filters with non-parallel elongated teeth. The angle between the elongated teeth of the two color filters is in one embodiment at least 10 degrees, at least 15 degrees and/or at least than 20 degrees in relation to each other.

FIGS. 1A and 1B illustrate the color filters 103A, 103B in a position where they are arranged outside the light beam 108. FIGS. 1A' and 1B' illustrate the color filters 1003A, 103B in a position where they are partially arranged inside the light beam 108. FIGS. 1A" and 1B" illustrate the color filters 103A, 103B in a position where they are partially arranged inside the light beam 108 in a partially overlapping position. FIGS. 1A'" and 1B'" illustrate the color filters 103A, 103B in a position where they are arranged inside the light beam 108 in an overlapping position.

Figure 2A:
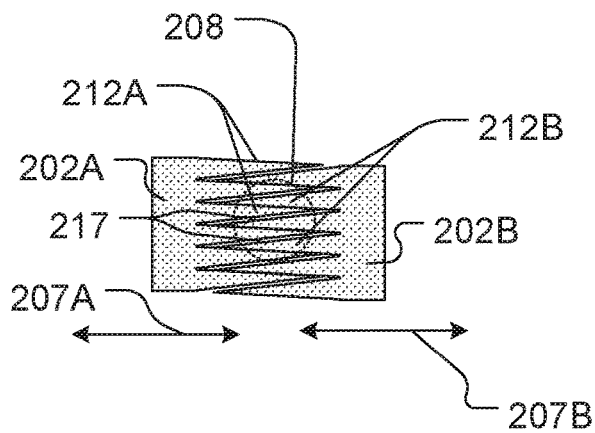
FIGS. 2A and 2B illustrate a structural view of a color filter pair according to prior art with different positions of the color filters.
Figure 2B:
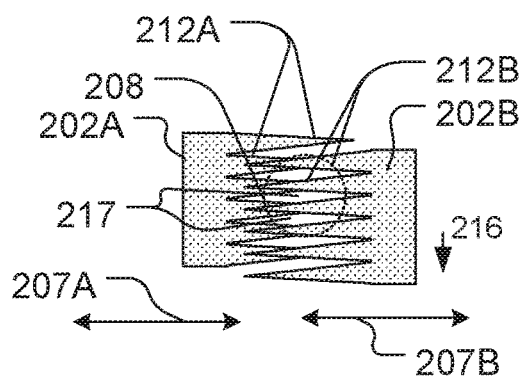

FIGS. 2A-2B illustrate a color filter pair according to prior art and serve to illustrate the issues occurring due to misalignment of the color filters in relation to each other. The prior art color filter pair comprises two color filters 202A, 202B linear moveable 207A, 207B relative to each other in parallel planes by actuators (not shown) respectively as illustrated by arrows 207A, 207B and can be inserted into a light beam 208 (indicated by dotted lines). The color filters comprise a plurality of elongated parallel teeth 212A, 212B shaped as triangles. The elongated parallel teeth can also be formed as rectangles or as described in WO0137032. FIG. 2A illustrates two properly aligned color filters at a position where they overlap inside the light beam in order to provide a filter effect to the light. In this position, small open areas 217 occur between the elongated parallel teeth 212A, 212B as some of the light must pass the color filters without being filtered. FIG. 2B illustrates two misaligned color filters at the same position as in FIG. 2A across the light beam. In this illustration color filter, 202B has been misaligned in the vertical direction as indicated by arrow 216. In this position, small open areas 217' that occur between the elongated parallel teeth 212A, 212B are much larger and consequently the resulting color provided by the color filter pair is different compared to the aligned situation shown in FIG. 2A. Therefor much effort is required to align the color filters when manufacturing light fixtures with such color filter pairs. Such miss alignment is especially visible when two identical light fixtures are supposed to provide the same color and even a small misalignment results in visible differences in the color of the light provided by the two light fixtures.

Figure 3A:
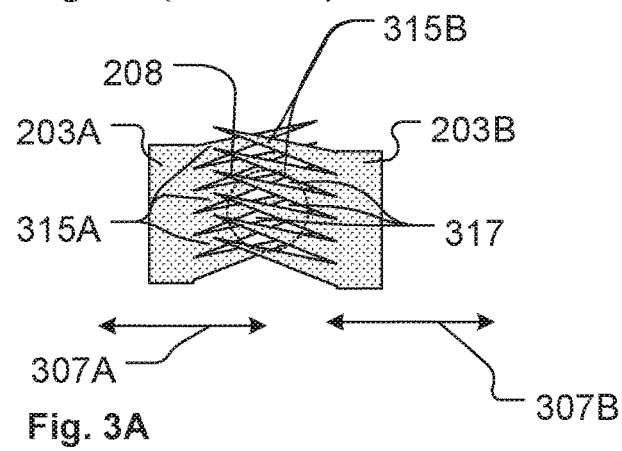
FIGS. 3A and 3B illustrate a structural view of a color filter pair according to the present invention with different positions of the color filters.
Figure 3B:
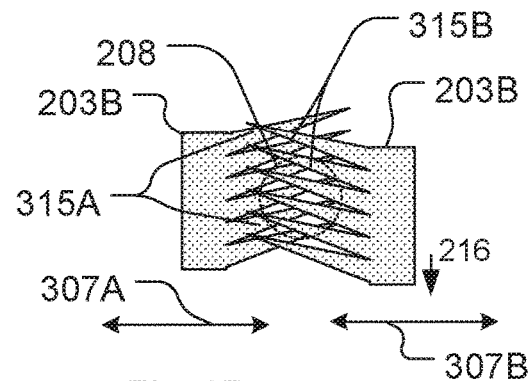

FIGS. 3A-3B illustrate a color filter pair according to the present invention and serve to illustrate that the issues occurring due to misalignment of the color filters in relation to the prior are can be reduced by providing the elongated teeth in a non-parallel pattern. The color filter pair comprises two color filters 303A, 303B linear moveable 307A, 307B relatively to each other in parallel planes by actuators (not shown) and which can be inserted into a light beam 208 (indicated by dotted lines). The color filters comprise a plurality of elongated non-parallel teeth 315A, 315B shaped as triangles. FIG. 3A illustrates two properly aligned color filters at a position where they overlap inside the light beam in order to provide a filter effect to the light. In this position, small open areas 317 occur between the elongated non-parallel teeth 315A, 315B as some of the light must pass the color filters without being filtered. FIG. 3B illustrates two misaligned color filters at the same position across the light beam as in FIG. 3A. In this illustration color filter 303B has been misaligned in the vertical direction with the same distance as the color filter 202B in FIG. 2B as indicated by arrow 216. In this position the small open areas 317' that occur between the elongated non-parallel teeth 315A, 315B may have changed their form however the total area of open areas inside the light beam are substantial the same and as a consequence the resulting color provided by the color filter pair is the same as in FIG. 3A. Thus, the issues with providing correct colors due to misalignment of the color filters can be reduced by providing the elongated teeth of the color filters in a non-parallel pattern.

Figure 4:
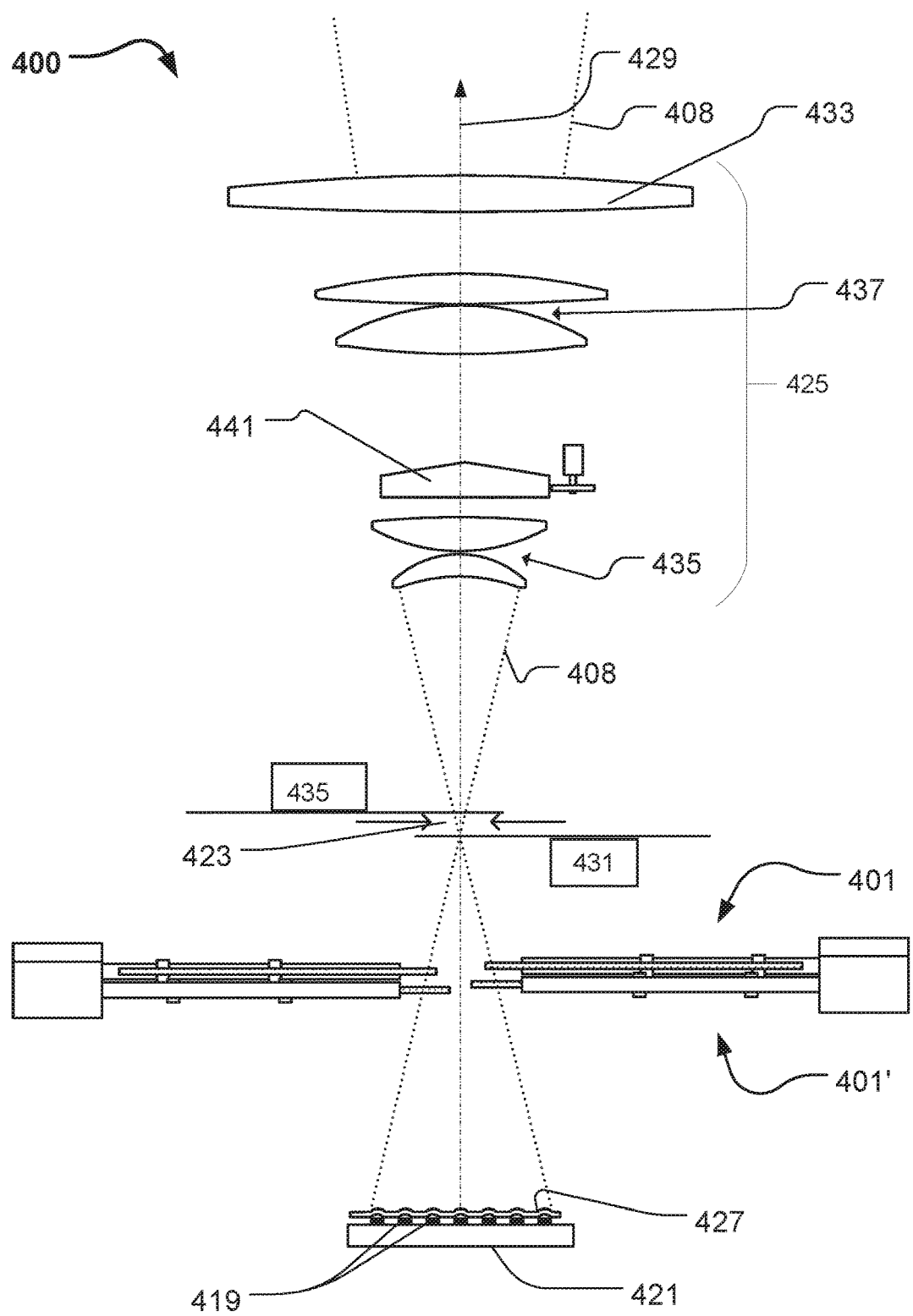
FIG. 4 illustrates a structural view of a light fixture comprising two color filter pairs according to the present invention.

FIG. 4 illustrates a structural diagram of a light fixture 400 comprising a first color filter pair 401 and a second color filter pair 401'. The first and second color filter pairs are illustrated in further details in FIGS. 5A-5C" and will not be described in connection with FIG. 4. It is to be understood that the illustrated color filter pairs only serve as examples of the color filter pairs and that the color filter pairs can be provided in many different ways. Further, it is to be understood that the light fixture may comprise only one color filter pair or a plurality of color filter pairs.

The light fixture 400 comprises a plurality of light sources 419 formed as LEDs arranged on a heat sink 421, an optical gate 423 and an optical assembly 425. A light collector 427 is adapted to collect light from the LEDs 419 and to convert the collected light into a plurality of light beams propagating along an optical axis 429 (dash-dotted line). Dotted lines 408 illustrate the outer boundary 408 of the light beams. The light rays' propagation through the optical assembly have not been illustrated for the purpose of simplicity. The light collector can be embodied as any optical means capable of collecting at least a part of the light emitted by the LEDs and capable of converting the collected light in to a light beam or a plurality of light beams forming a common light beam. In the illustrated embodiment, the light collector comprises a number of lenslets each collecting light from one of the LEDs and converting the light into a corresponding light beam. However, it is noticed that the light collector also can be embodied as a single optical lens, a Fresnel lens, a number of TIR lenses (total reflection lenses), a number of light rods etc. or combinations thereof. The light collector may be configured to fill the optical gate 423 with light from the light sources 419 so that the area, i.e. the aperture, of the optical gate 423 is illuminated with a uniform intensity or optimized for max output. The optical gate 423 is arranged along the optical axis 429.

The optical assembly 425 may be configured to collect at least a part of the light beams transmitted through the optical gate 423 and to image the optical gate at a distance along the optical axis. For example, the optical assembly 425 may be configured to image the optical gate 423 onto some object such as a screen, e.g. a screen on a concert stage. A certain image, e.g. some opaque pattern provided on a transparent window, an open pattern in a non-transparent material, or imaging object such as GOBOs known in the field of entertainment lighting, may be arranged within the optical gate so that that the illuminated image can be imaged by the optical assembly. The GOBO may for instance be provided as a gobo wheel system 431 comprising a plurality of GOBOs as known in the art of entertainment lighting. Accordingly, the light fixture 400 may be used for entertainment lighting.

In the illustrated embodiment, the light is directed along the optical axis 429 by the light collector 427 and passes through a number of light effects before exiting the light fixture through a front lens 433. The light effects can for instance be any light effects known in the art of intelligent/entertainments lighting for instance, a CMY color mixing system (e.g. provided as a plurality of color filter pairs according to the present invention), color filters (not shown), GOBOs 431, animation effects 435, a iris diaphragm (not shown), a focus lens group 437, a zoom lens group 439, prism effect 441, framing effects (not shown), or any other light effects known in the art. The mentioned light effects only serve to illustrate the principles of an illuminating device for entertainment lighting and the person skilled in the art of entertainment lighting will be able to construct other variations with additional or less light effects. Further, it is noticed that the order and positions of the light effects can be changed.

Figure 5A:
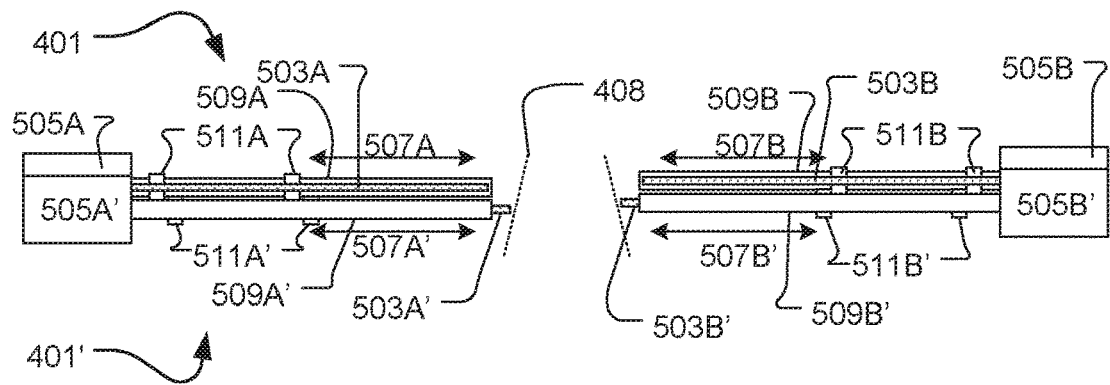
FIGS. 5A, 5A', and 5A" illustrate top structural views of the color filter pair of the light fixture illustrated in FIG. 4 at different positions of the color filters.
Figure 5B:
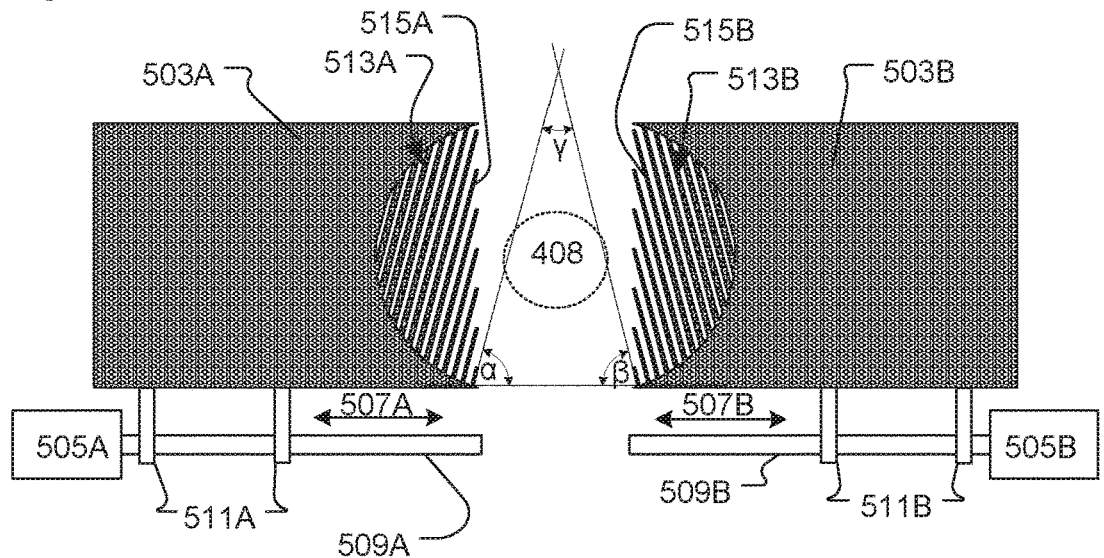
FIGS. 5B, 5B', and 5B" illustrate front structural views of the first color filter pair of the light fixture illustrated in FIG. 4 at different positions of the color filters.
Figure 5C:
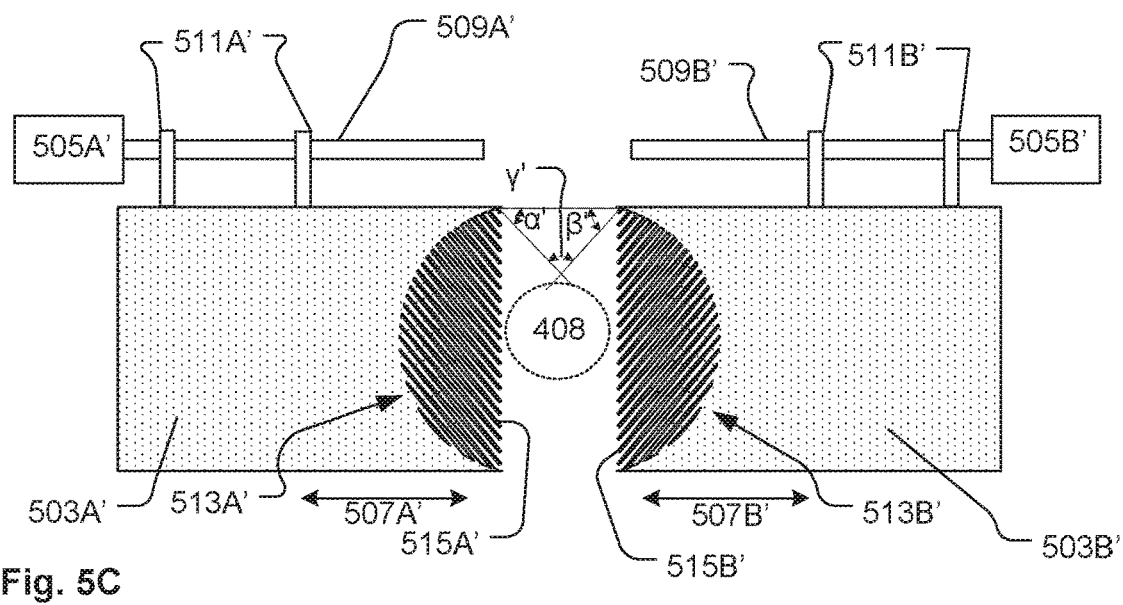
FIGS. 5C, 5C', and 5C" illustrate front structural views of the second color filter pair of the light fixture illustrated in FIG. 4 at different positions of the color filters.
Figure 5A:
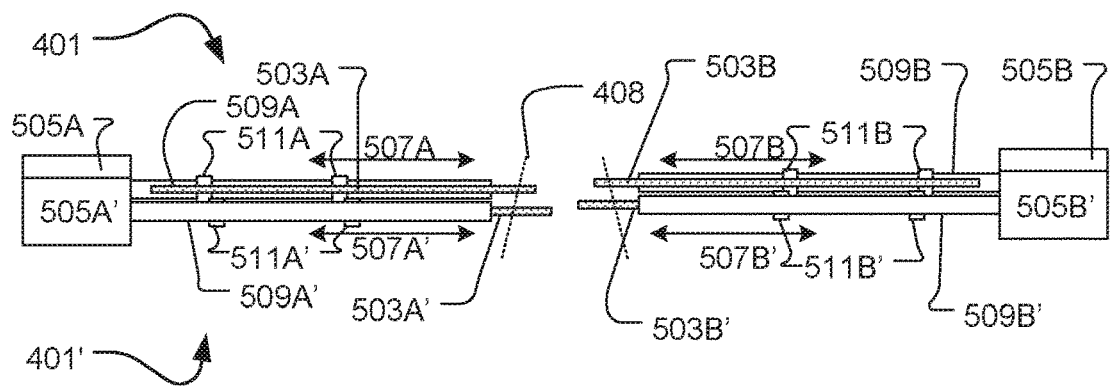
Figure 5B:
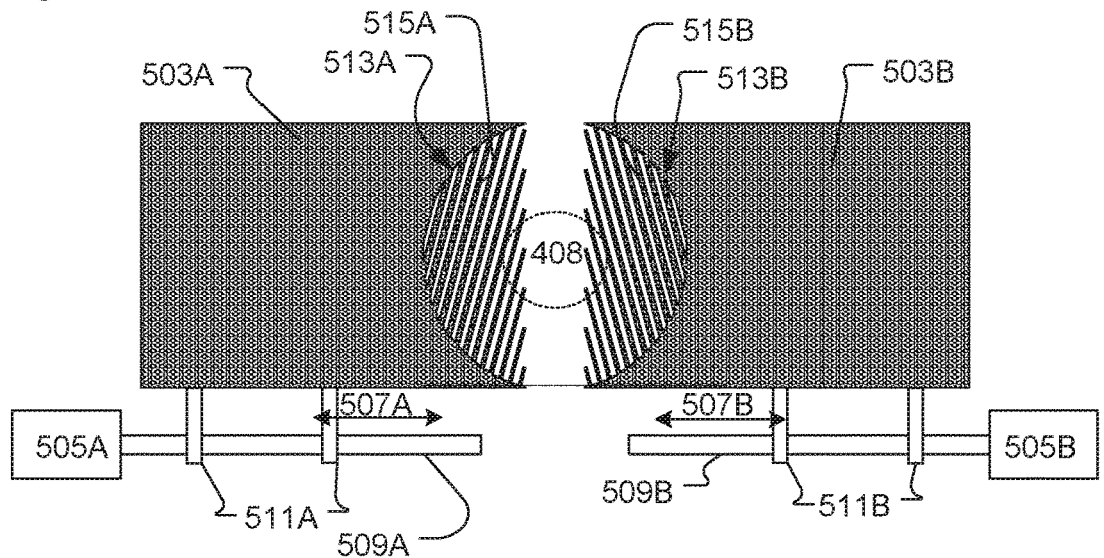
Figure 5C:
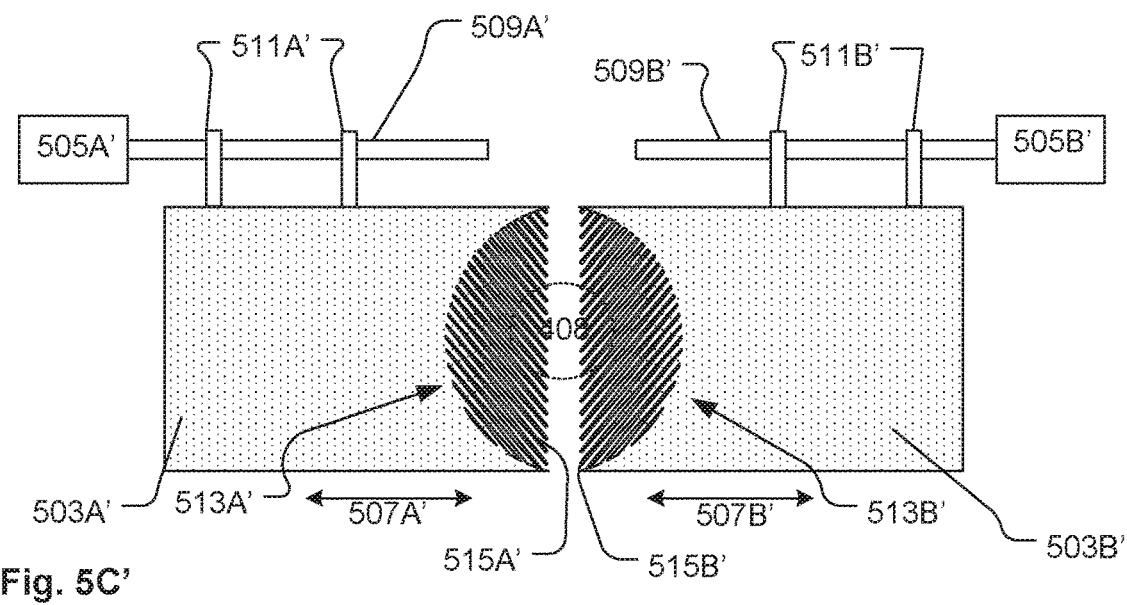
Figure 5A:
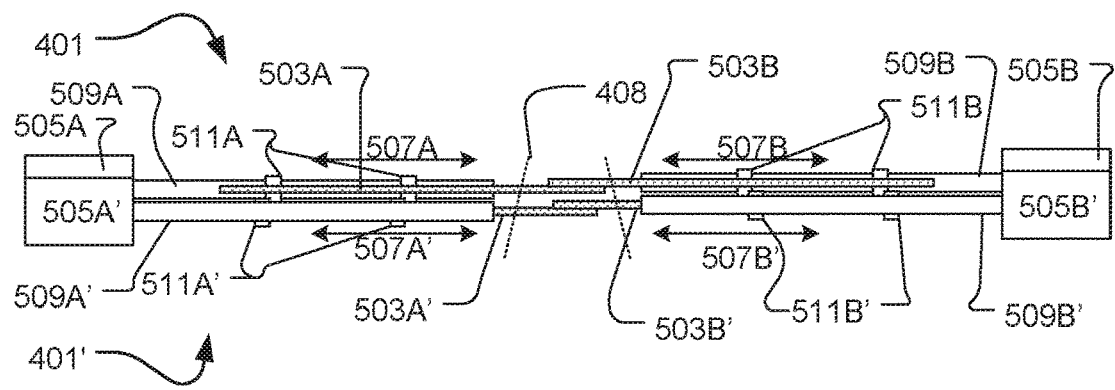
Figure 5B:
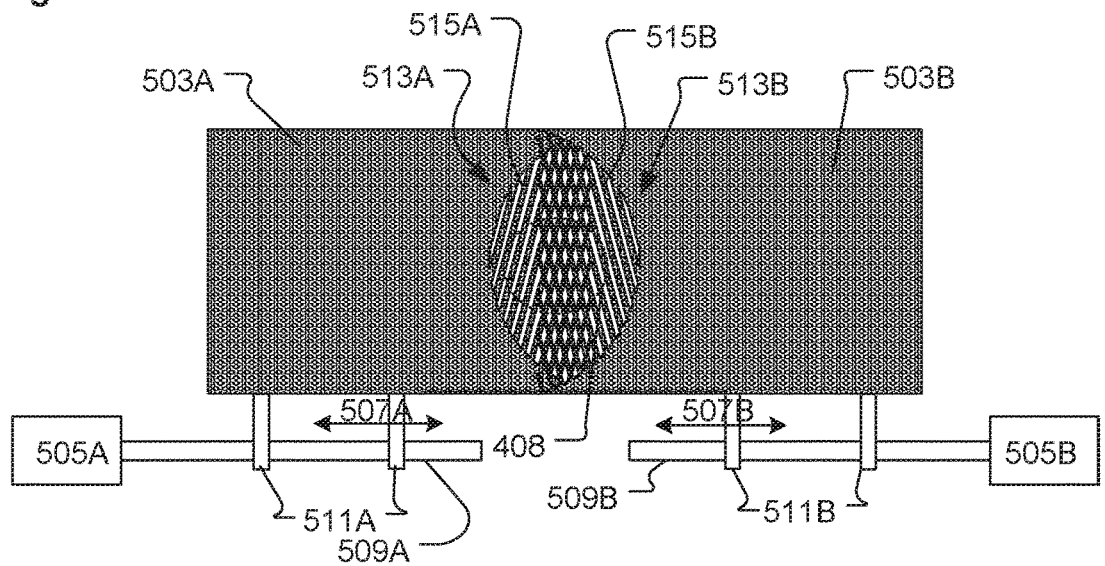
Figure 5C:
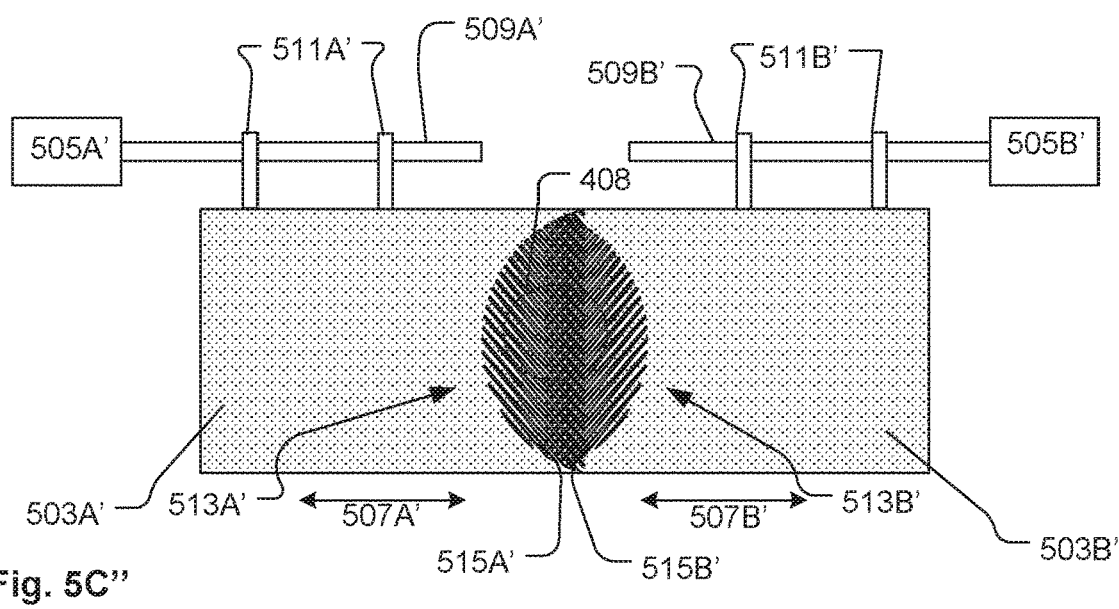

FIGS. 5A, 5A', 5A", 5B, 5B', 5B", 5C, 5C' and 5C" illustrate a structural diagram of a first color filter pair 401 and a second color filter pair 401' for a light fixture like the light fixture illustrated in FIG. 4. FIG. 5A, 5A' and 5A" illustrate top views of the color filter pairs and illustrate different positions of the color filters in relation to each other. FIG. 5B, 5B' and 5B" illustrate front views of the first color filter pair 401 and illustrate different positions of the color filters in relation to each other. FIG. 5C, 5C' and 5C" illustrate front views of the second color filter pair 401' and illustrate different positions of the color filters in relation to each other.

The first color filter pair 401 comprises two color filters 503A, 503B linear moveable relative to each other in parallel planes by actuators 505A, 505B respectively as illustrated by arrows 507A, 507B. The color filters 503A and 503B are respectively linear moveable by the actuators 505A and 505B and can be inserted into the light beam 408 (indicated by dotted lines). The actuators 505A, 505B comprise a spindle 509A, 509B, which upon rotation moves a threaded attachment mechanism 511A, 511B, which connects a color filter to the spindle and thus moves the color filters along the spindle upon rotation of the spindle. The color filters 503A and 503B are provide as substantial plane color filters comprising a color filtering region (illustrated as shaded area) configured to provide a filter effect to the light beam when inserted into the light beam. The filter region can be provided as any material capable of providing a filtering effect for the light beam for instance color gels, dichroic filters or the like. A part of the color filtering regions is formed as a comb-like structure 513A, 513B comprising a plurality of elongated teeth 515A, 515B where the plurality of the elongated teeth are angled in relation to the direction of movement of the color filters. The angle of the elongated teeth 515A is illustrated as angle α, the angle of the elongated teeth 515B is illustrated as angle β and the angle between the elongated teeth 515A and 515B is illustrated as γ. The angle γ between the elongated teeth of the two color filter is defined as the acute angle formed between elongated teeth of the two color filters. However, the angle between the elongated teeth of the two color filter in one embodiment can be a right/even angle.

The second color filter pair 401' comprises similar features as the first color filter pair 401 and similar features of the second color filter pair have been given the same reference numbers as the same feature of the first color filter pair but with prime symbol ' at the end of the reference number.

The first and second color filter pairs are arranged close to each other and provide different filter effects. For instance, the color filters of the first color filter pair may have a first filter characteristic and the color filters of the second color filter pair may have a second filter characteristic different from the first characteristics.

The elongated teeth of the two color filters of the same color filter pair are non-parallel in relation to each other, meaning that the angle between the elongated teeth of the two color filters of the same color filter pair are larger than 0 degrees.

Further, the elongated teeth of the color filters of different color filter pairs are non-parallel in relation to each other, meaning that the angle between the elongated teeth of the color filters of the first and second color filter pairs are larger than 0 degrees.

Figure 6:
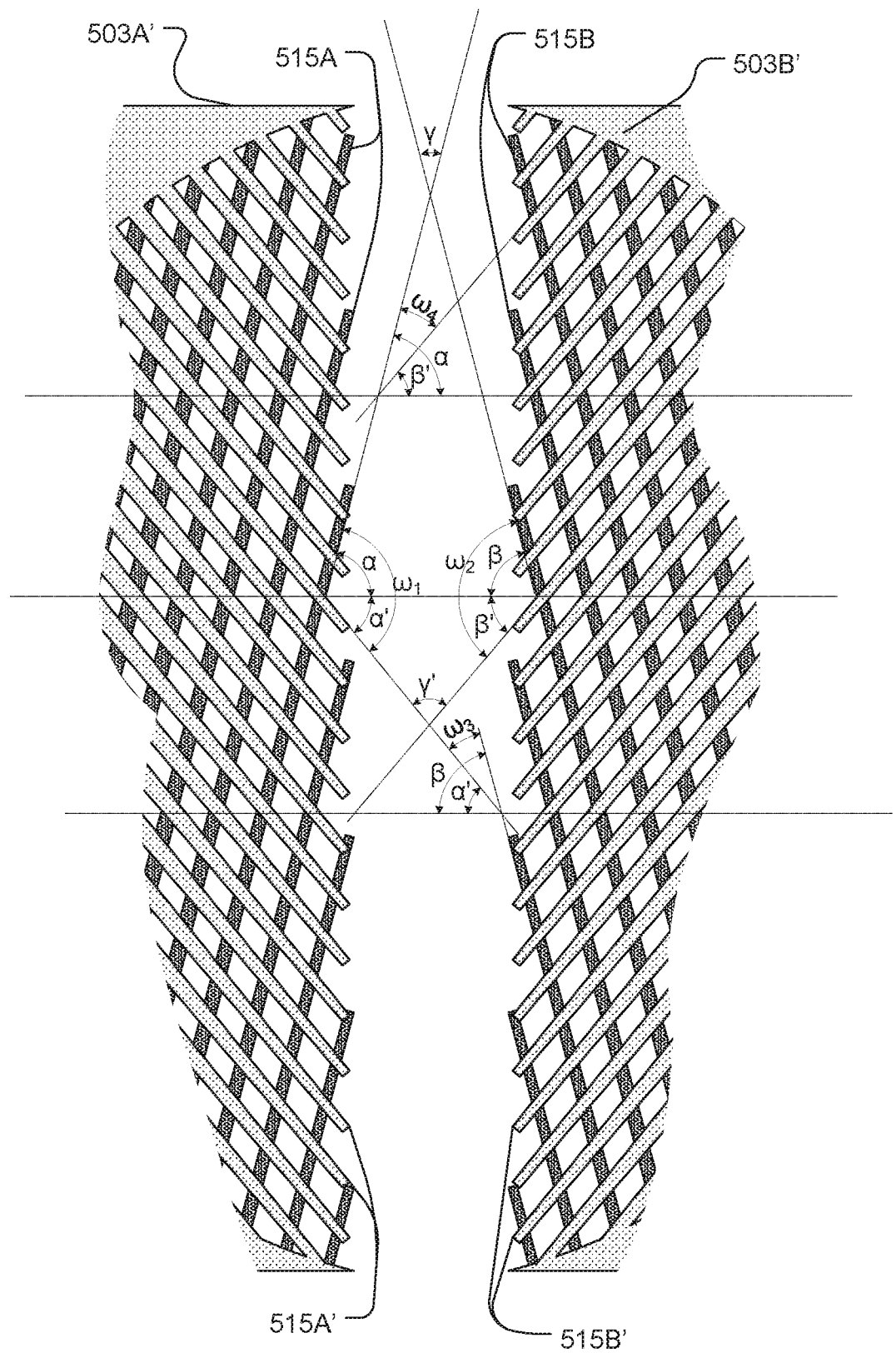
FIG. 6 illustrates an enlarged view of the color filters of the first and second filter pairs of the light fixture illustrated in FIG. 5 as seen from the light sources.

FIG. 6 illustrates an enlarged view of the color filters of the first and second filter pairs as seen from the light sources. The color filters are arranged in the following order along the optical axis: 503A', 503B', 503A, 503B where in FIG. 6 the color filter 503A' is arranged as the top most color filter. FIG. 6 serves to illustrate the angles between the elongated teeth of the color filters.

The angle of the elongated teeth 515A of the first color filter 503A of the first color filter pair 401 in relation to the direction of movement is illustrated as α. The angle of the elongated teeth 515B of the second color filter 503B of the first color filter pair 401 in relation to the direction of movement is illustrated as β. The angle of the elongated teeth 515A' of the first color filter 503A' of the second color filter pair 401' in relation to the direction of movement is illustrated as α'. The angle of the elongated teeth 515B' of the second color filter 503B' of the second color filter pair 401' in relation to the direction of movement is illustrated as β'.

The angle between the elongated teeth 515A of the first color filter 503A and the elongated teeth 515B of the second color filter 503B of the first color filter pair 401 is illustrated as γ. The angle between the elongated teeth 515A' of the first color filter 503A' and the elongated teeth 515B' of the second color filter 503B' of the second color filter pair 401' is illustrated as γ'.

The angle between the elongated teeth of the color filters of the different color filter pairs are illustrated as angles $\omega_1$, $\omega_2$, $\omega_3$ and $\omega_4$. $\omega_1$ illustrates the angle between the elongated teeth 515A of the first color filter 503A of the first color filter pair 401 and the elongated teeth 515A' of the first color filter 503A' of the second color filter pair 401'. $\omega_2$ illustrates the angle between the elongated teeth 515B of the second color filter 503B of the first color filter pair 401 and the elongated teeth 515B' of the second color filter 503B' of the second color filter pair 401'. $\omega_3$ illustrates the angle between the elongated teeth 515A' of the first color filter 503A' of the second color filter pair 401' and the elongated teeth 515B of the second color filter 503B of the first color filter pair 401. $\omega_4$ illustrates the angle between the elongated teeth 515A of the first color filter 503A of the first color filter pair 401 and the elongated teeth 515B' of the second color filter 503B' of the second filter pair 401.

The angles $\omega_1$, $\omega_2$, $\omega_3$ and $\omega_4$ are larger than zero resulting in a non-parallel structure between the elongated teeth of the color filters. The non-parallel structure of the elongated teeth of the two color filters of the different color filter pairs provides a more robust and reliable color mixing system as the non-parallel teeth are less sensible to misalignments between the color filters. In the prior art the elongated teeth are arranged in parallel patterns and a small misalignment between the two color fitters in the vertical direction in relation to the linear translation path of the color filters results in the fact that additional open areas occur between the elongated teeth. This results in the fact that less light is provided with the filter effect of the color filters and thereby it is not possible to control the color mixing. By providing the elongated teeth of the two color filters as non-parallel teeth reduces this effect, as misalignment of non-parallel elongated teeth in the vertical direction in relation to the linear translation path do not result in additional open areas as the non-parallel can be moved vertically in relation to each other without creating additional open areas. Further in light fixtures, where a plurality of light sources such as LEDs generate the light, additional openings may also occur between the parallel elongated teeth of the prior art color filters. This is because the plurality of light sources emit light from different positions and at different angles in relation to the color filters. This effect can also be avoided by providing the two color filters with non-parallel elongated teeth. Additional Moiré effects occurring between the elongated teeth of different colors filters can also be avoided by providing the elongated teeth at different angles in relation to each other and in relation to the direction of movement. The angle between the elongated teeth of the color filters of two color filter pairs is in other embodiments at least 10 degrees, at least 15 degrees and/or at least 20 degrees in relation to each other. In embodiments with a plurality of color filter pairs, the angle between the elongated teeth of the color filters of one color filter pair and any one of the other color filters of any other of the color filter pairs may be at least 10 degrees, at least 15 degrees and/or at least 20 degrees.

Figure 7:
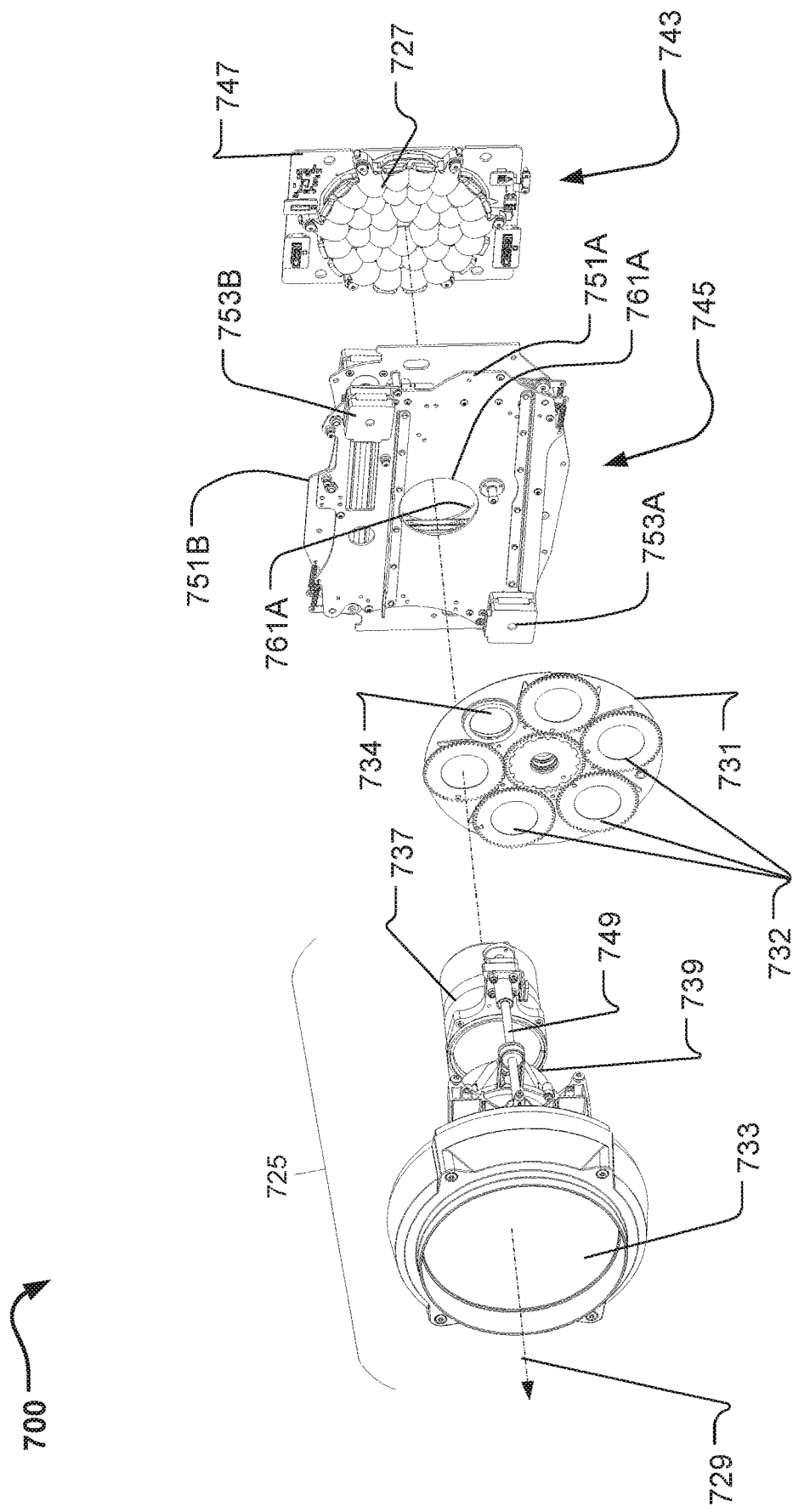
FIG. 7 illustrates a perspective view of a light fixture comprising a color filter module comprising four color filter pairs according to the present invention.

FIG. 7 illustrates a perspective view of a light fixture 700 comprising a plurality of color filter pairs. The light fixture 700 comprises a light source module 743, color filter module 745, a GOBO wheel 731 and an optical assembly 725. The light source module comprises a plurality of LEDs [not visible] arranged on a PCB 747 (printed circuit board) and a light collector 727 is adapted to collect light from the LEDs and to convert the collected light into a plurality of light beams [not shown] propagating along an optical axis 729 (dash-dotted line). The light collector 727 comprises a number of lenslets each collecting light from one of the LEDs and converting the light into a corresponding light beam.

The GOBO wheel 731 comprises a plurality of rotating GOBOs as known in the art of entertainment lighting and the GOBOs form an optical gate where through the light is directed. In the illustrated embodiment, the GOBO wheel comprises five rotatable GOBOs 732 and an open gate 734.

The optical assembly 725 is configured to collect light transmitted through the GOBOs and to image the GOBO at a distance along the optical axis. The optical assembly comprises a focus lens group 737, a zoom lens group 739 and a front lens 733. The zoom lens group and the focus lens group comprises a number of optical lenses arranged in a lens housing, which is movable attached to a track 749 whereby the zoom and focus lens groups can by an actuator [not shown] be moved along the optical axis in order to perform zoom and focusing of the light beam.

The color filter module 745 comprises four color filter pairs referred to as a first color filter pair, a second color filter pair, a third color filter pair and a fourth color filter pair. The first and second color filter pairs are arranged on a first carrying frame 751A and the third and fourth color filter pairs are arranged on a second carrying frame 751B. The first carrying frame and the second carrying frame comprise respectively an opening 761A, 761B where through the light beam can pass the color filter module. The color filters of the first color filter pair are moved by a first color filter actuator 753A, the color filters of the second color filter pair are moved by a second color filter actuator 753B, the color filters of the third color filter pair are moved by a third color filter actuator 753C and the color filters of the fourth color filter pair are moved by a fourth color filter actuator [not visible].

Figure 8A:
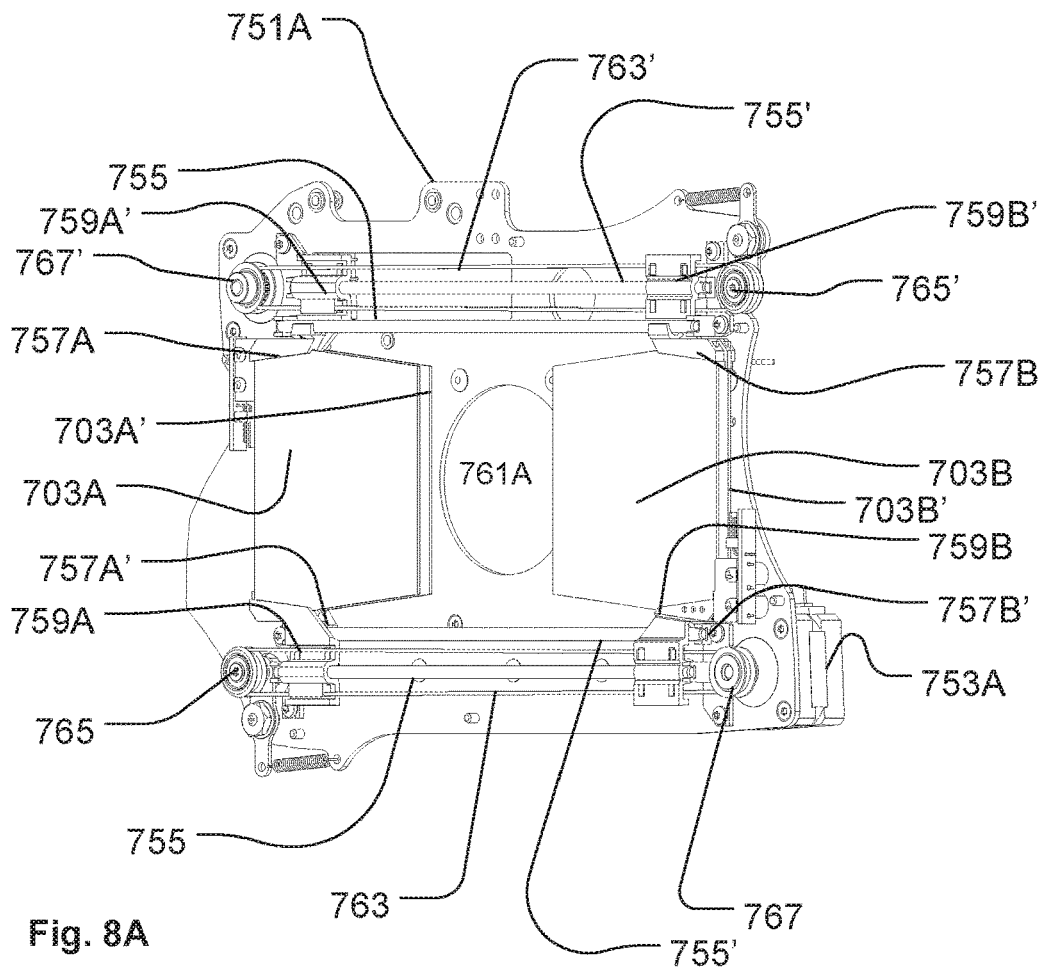
FIG. 8A illustrates a perspective view of a first carrying frame of the color filter module of the light fixture illustrated in FIG. 7.

FIG. 8A illustrates a perspective view of the first carrying frame 751A seen from the light source side thus the opposite side compared to the view angle in FIG. 7. The first color filter pair and the second color filter pair are attached to the first carrying frame 751A.

The first color filter pair comprises a first color filter 703A and a second color filter 703B. The elongated teeth of the first 703A and second 703B color filter are not shown in FIG. 8A but can be seen in FIG. 9A. The first color filter 703A is slideable attached to a pair of guiding tracks 755 via a passive sliding mechanism 757A and an active sliding mechanism 759A. Similarly, the second color filter 703B is slideable attached to the pair of guiding tracks 755 via passive sliding mechanism 757B and active sliding mechanism 759B. The passive sliding mechanisms and the active sliding mechanisms are slideable along the guiding tracks and the first color filter 703A and the second color filter 703B can thus be moved along the guiding tracks whereby the color filters can be inserted into a light beam passing through the opening 761A of the first carrying frame 751A. A drive belt 763 is winded around a passive pulley 765 and an active pulley 767. The active sliding mechanism 759A is attached to one side of drive belt 763 [the upper side] and the active sliding mechanism 759B is attached to the other side of the drive belt 763 [the lower side]. Rotation of the driving belt 763 in a clockwise direction around the passive pulley 765 and the active pulley 767 causes the color filters 703A and 703B to move towards and into (above) opening 761A and thus into a light beam passing through the opening. The first color filter actuator 753A rotates the active pulley 767.

The second color filter pair comprises a first color filter 703A' and a second color filter 703B'. The elongated teeth of the first 703A' and second 703B' color filters are not shown in FIG. 8A but can be seen in FIG. 9B. The first color filter 703A' and the second color filter 703B' of the second color filter pair are simultaneously movable inside the light beam via a similar belt mechanism as described in connection with the first color filter pair above. Similar features have been labeled with the same reference numbers as described in connection with the first color filter pair but marked with a prime symbol ' and will not be described further.

Figure 8B:
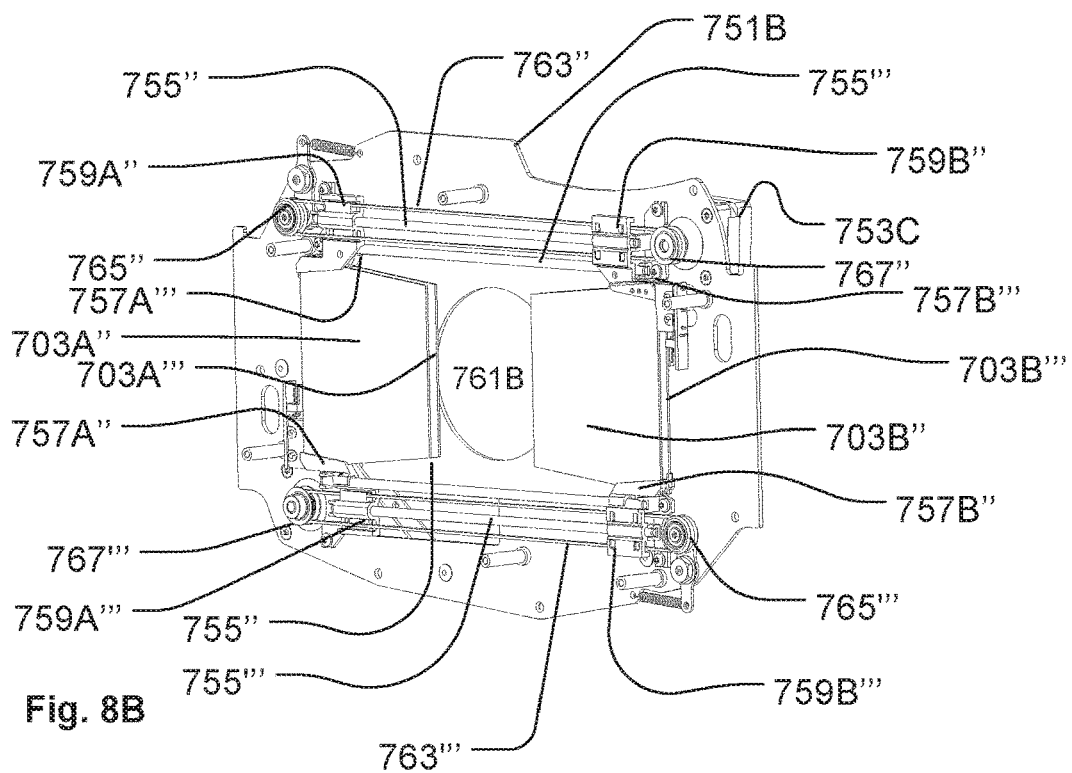
FIG. 8B illustrates a perspective view of a second carrying frame of the color filter module of the light fixture illustrated in FIG. 7.

FIG. 8B illustrates a perspective view of the second carrying frame 751B seen from the GOBO side thus the same viewing angle as in FIG. 7. The third color filter pair and the fourth color filter pair are attached to the second carrying frame 751B. The third color filter pair comprises a first color filter 703A" and a second color filter 703B". The elongated teeth of the first 703A" and second 703B" color filter are not shown in FIG. 8B but can be seen in FIG. 9C, The first color filter 703A" and the second color filter 703B" of the third color filter pair can be simultaneously moved into the light beam via a similar belt mechanism as described in connection with the first color filter pair above. Similar features have been labeled with the same reference numbers as described in connection with the first color filter pair but marked with a double prime symbol " and will not be described further.

The first color filter 703A''' and the second color filter 703''' of the fourth color filter pair can be simultaneously moved into the light beam via a similar belt mechanism as described in connection with the first color filter pair above. Similar features have been labeled with the same reference numbers as described in connection with the first color filter pair but marked with a triple prime symbol ''' and will not be described further. The elongated teeth of the first 703A''' and second 703B''' color filter are not shown in FIG. 8B but can be seen in FIG. 9D.

Figure 9A:
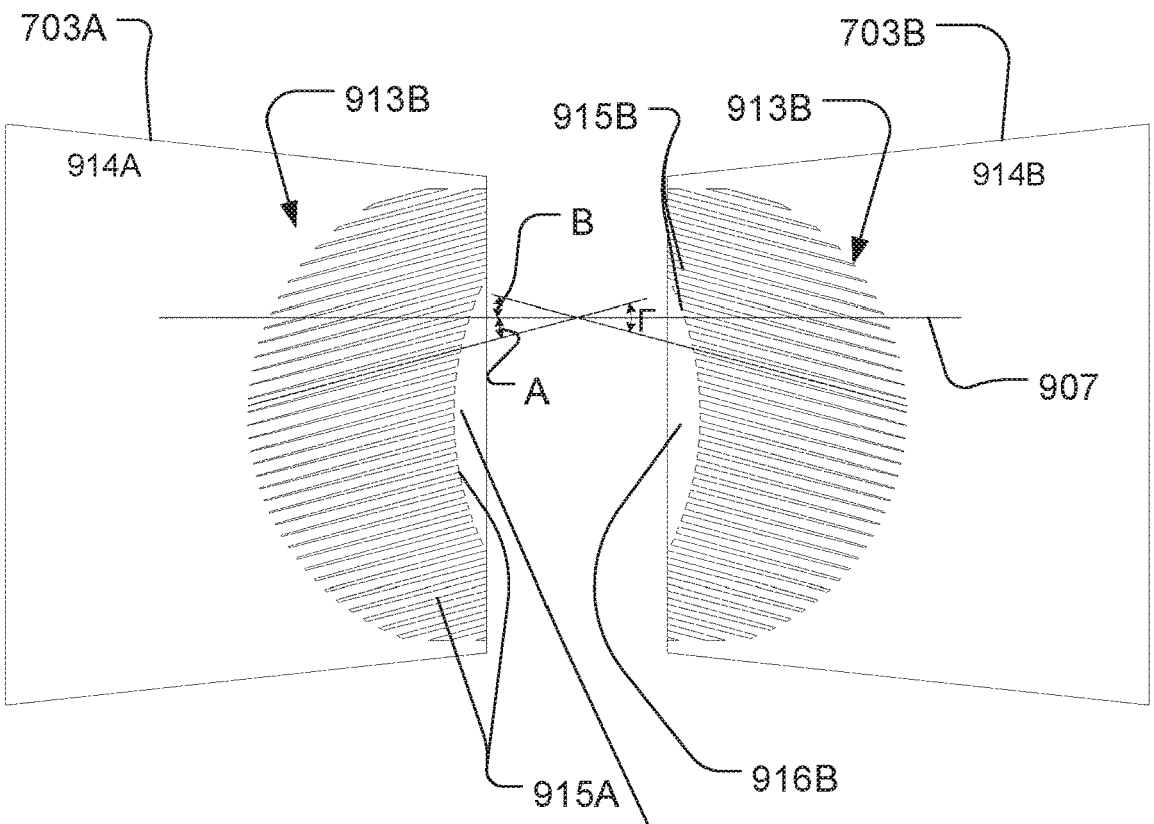
FIGS. 9A, 9B, 9C and 9D illustrates respectively a first color filter pair, a second color filter pair, a third color filter pair and a fourth color filter pair of the color filter module of the light fixture illustrated in FIG. 7.

FIG. 9A illustrates the first color filter 703A and the second color filter 703B of the first color filter pair of the color filter module illustrated in FIG. 8A. The color filters are provide as substantial plane color filters comprising a color filtering region configured to provide a filter effect to the light beam when inserted into the light beam. The color filters 703A and 703B are provided as dichroic filters where a dichroic filter material is applied to a flat piece of glass. The color filter region comprises a full filter region 914A, 914B where the color filter provides a full color filtering effect to the light beam. At least a part of the color filters is formed as a comb-like structure 913A, 913B comprising a plurality of elongated teeth 915A, 915B separated by non-filtering regions, whereby the comb-like structure can provide a partial filtering effect to the light beam. The color filter comprises also a clear region 916B, 916B where no dichroic filter material has been applied to the piece of glass. The dichroic filter material can be applied to the glass using any known methods for applying dichroic filter material to glass and the comb-like structure 913A, 913B and clear region can be provided by removing the dichroic filter material for instance by etching or laser ablation techniques. Alternatively to glass it is to be understood that other transparent material also may be used, e.g. polymers or silicone. The clear region is formed such that the tips of some of the elongated teeth of each of said two color filters form a curved edge at one side of the clear area. Consequently, the elongated teeth surrounding the light beam can be inserted more homogeneously into a round light beam. The angle A of the elongated teeth 915A of color filter 703A is 15 degrees in relation to the direction of movement (illustrated by dotted line 907) and the angle B of the elongated teeth 915B of color filter 703B is 15 degrees in relation direction of movement. Additionally the inclination of the elongated teeth 915A and the elongated teeth 915B are opposite. In FIGS. 9A, 9B, 9C, 9D and 10 a positive inclination is illustrated as an elongated tooth having a sloop of inclination that increases (moves upwardly) when following the tooth from left to right of the drawing. Opposite a negative inclination is illustrated as an elongated tooth having a sloop of inclination that decreases (moves downwardly) when following the tooth from left to right of the drawing. Consequently, the elongated teeth 915A have a positive inclination and elongated teeth 915B have a negative inclination and the angle Γ between the elongated teeth 915A and 915B is 30 degrees.

Figure 9B:
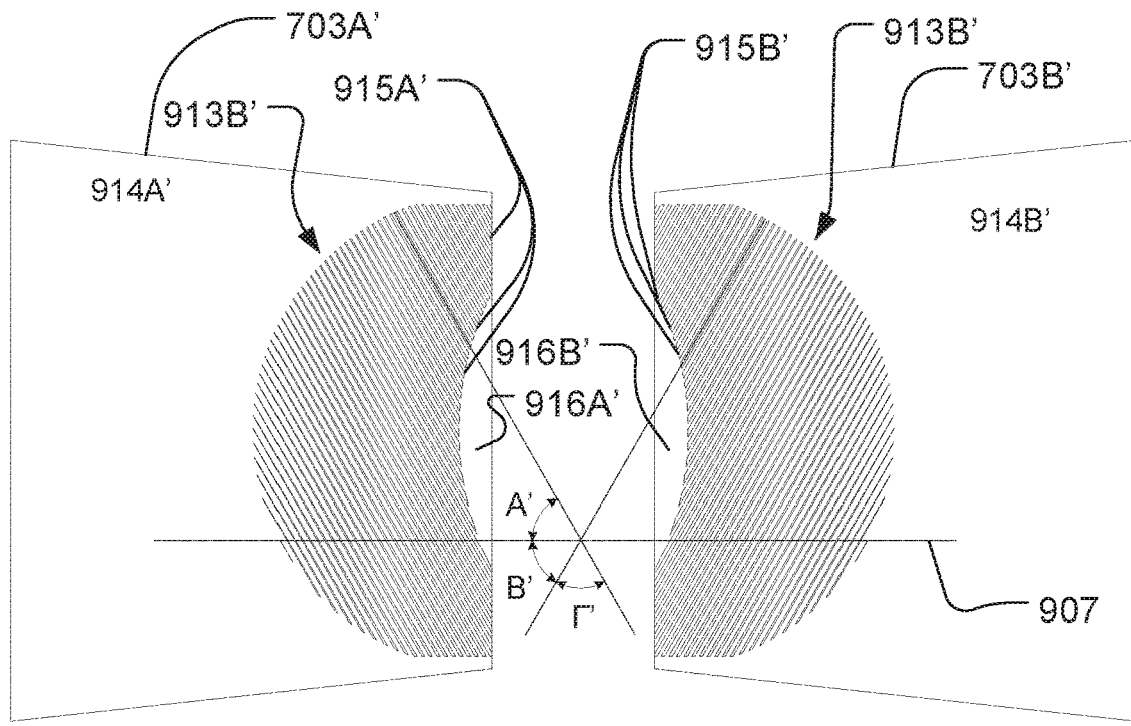

FIG. 9B illustrates the first color filter 703B' and the second color filter 703B' of the second color filter pair of the color filter module illustrated in FIG. 8A. The color filters are provide as substantial plane color filters comprising a color filtering region configured to provide a filter effect to the light beam when inserted into the light beam. The color filters 703A' and 703B' are provided as dichroic filters where a dichroic filter material is applied to a flat piece of glass. The color filter region comprises a full filter region 914B', 914B' where the color filter provides a full color filtering effect to the light beam. At least a part of the color filter is formed as a comb-like structure 913A', 913B' comprising a plurality of elongated teeth 915A', 915B' separated by non-filtering regions, whereby the comb-like structure can provide a partial filtering effect to the light beam. The color filter comprises also a clear region 916B', 916B' where no dichroic filter material have been applied to the piece of glass. The clear region is formed such the tips of at some of the elongated teeth of each of said two color filters form a curved edge at one side of the clear area. Consequently, the elongate teeth surrounding the light beam will be inserted more homogeneous into a round light beam. The angle A' of the elongated teeth 915A' of color filter 703A' is 60 degrees in relation to the direction of movement (illustrated by dotted line 907) and the angle B of the elongated teeth 915B' of color filter 703B' is 60 degrees in relation to the direction of movement the inclination of the elongated teeth 915A' and the elongated teeth 915B' are opposite, where the elongated teeth 915A' have negative inclination and elongated teeth 915B' have a positive inclination and the angle Γ' between the elongated teeth 915A' and 915B' is 60 degrees.

Figure 9C:
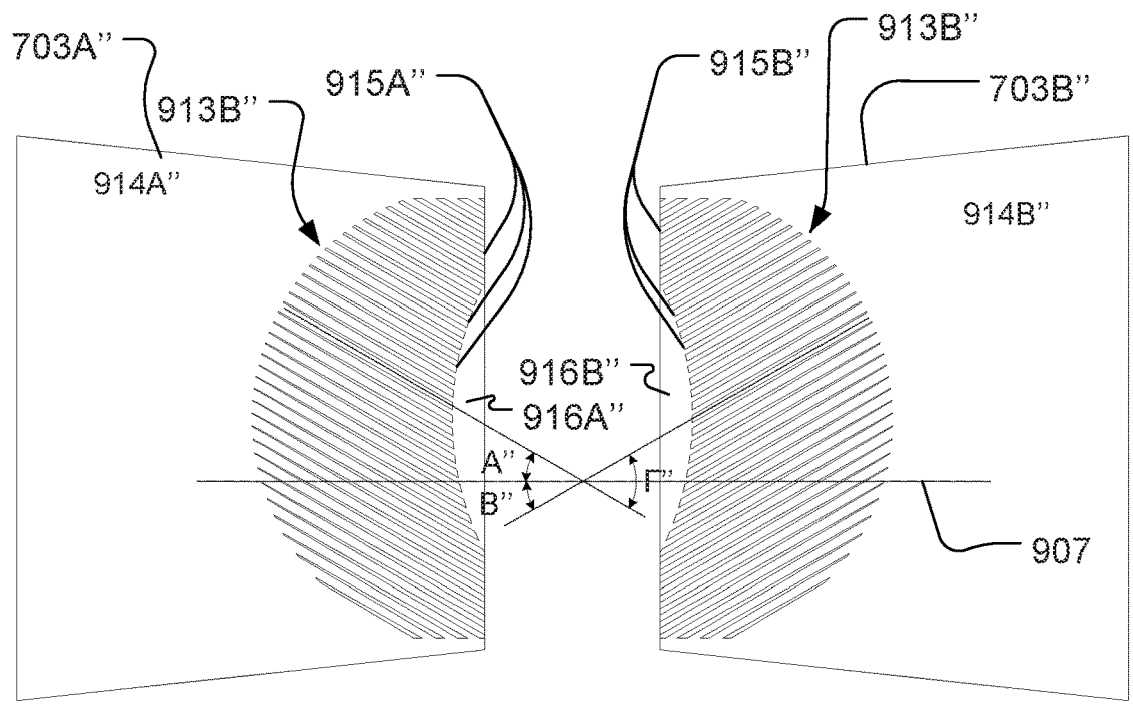

FIG. 9C illustrates the first color filter 703B" and the second color filter 703B" of the third color filter pair of the color filter module illustrated in FIG. 8B. The color filters are provided as substantial plane color filters comprising a color filtering region configured to provide a filter effect to the light beam when inserted into the light beam. The color filters 703A" and 703B" are provided as dichroic filters where a dichroic filter material is applied to a flat piece of glass. The color filter region comprises a full filter region 914B", 914B" where the color filter provides a full color filtering effect to the light beam. At least a part of the color filter is formed as a comb-like structure 913A", 913B" comprising a plurality of elongated teeth 915A", 915B" separated by non-filtering regions, whereby the comb-like structure can provide a partial filtering effect to the light beam. The color filter comprises also a clear region 916B", 916B" where no dichroic filter material has been applied to the piece of glass. The clear region is formed such that the tips of some of the elongated teeth of each of said two color filters form a curved edge at one side of the clear area. Consequently, the elongated fingers surrounding the light beam will be inserted more homogeneous into a round light beam. The angle A" of the elongated teeth 915A" of color filter 703A" is 30 degrees in relation to the direction of movement (illustrated by dotted line 907) and the angle B" the elongated teeth 915B" of color filter 703B" is 30 degrees in relation to the direction of movement. The inclination of the elongated teeth 915A" and the elongated teeth 915B" are opposite, where the elongated teeth 915A" have negative inclination and elongated teeth 915B" have a positive inclination and the angle Γ" between the elongated teeth 915A" and 915B" is 60 degrees.

Figure 9D:
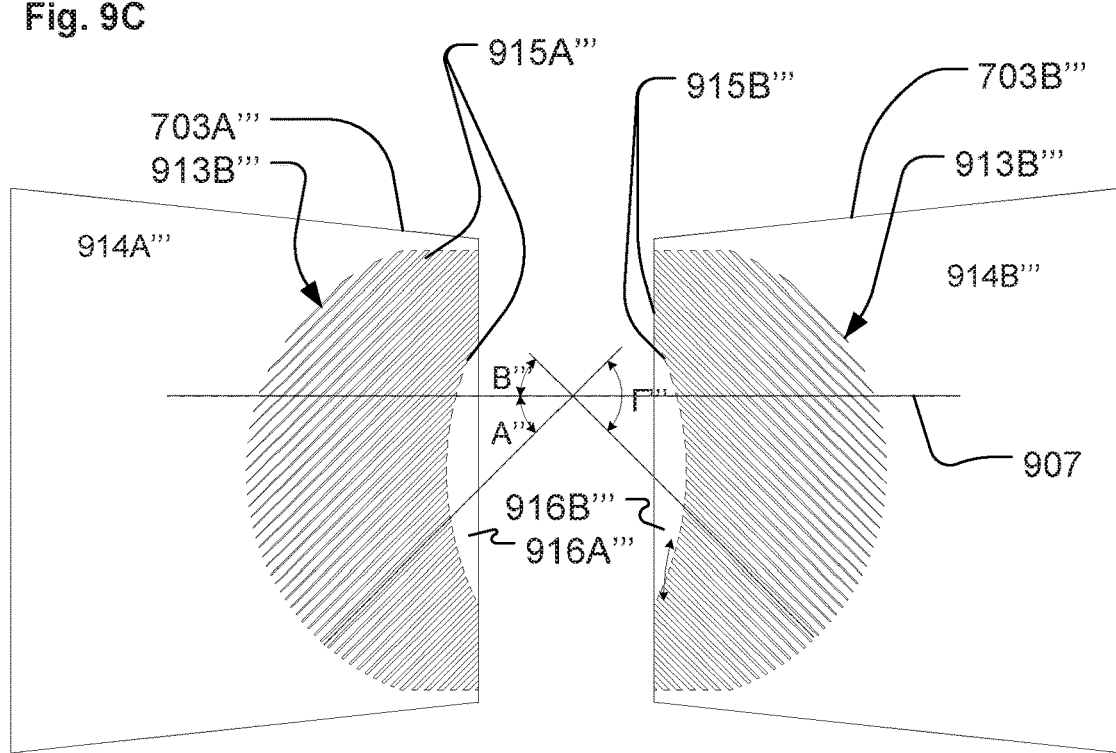

FIG. 9D illustrates the first color filter 703B''' and the second color filter 703B''' of the fourth color filter pair of the color filter module illustrated in FIG. 8B. The color filters are provided as substantial plane color filters comprising a color filtering region configured to provide a filter effect to the light beam when inserted into the light beam. The color filters 703A''' and 703B''' are provided as dichroic filters where a dichroic filter material is applied to a flat piece of glass. The color filter region comprises a full filter region 914B''', 914B''' where the color filter provides a full color filtering effect to the light beam. At least a part of the color filter is formed as a comb-like structure 913A''', 913B''' comprising a plurality of elongated teeth 915A''', 915B''' separated by non-filtering regions, whereby the comb-like structure can provide a partial filtering effect to the light beam. The color filter comprises also a clear region 916B''', 916B''' where no dichroic filter material have been applied to the piece of glass. The clear region is formed such that the tips of some of the elongated teeth of each of said two color filters form a curved edge at one side of the clear area. Consequently, the elongated teeth surrounding the light beam will be inserted more homogeneous into a round light beam. The angle A''' of the elongated teeth 915A''' of color filter 703A''' is 45 degrees in relation to the direction of movement (illustrated by dotted line 907) and the angle B''' the elongated teeth 915B''' of color filter 703B''' is 45 degrees in relation to the direction of movement. The inclination of the elongated teeth 915A''' and the elongated teeth 915B''' are opposite, where the elongated teeth 915A''' have positive inclination and elongated teeth 915B''' have a negative inclination and the angle Γ''' between the elongated teeth 915A''' and 915B''' is 90 degrees.

Figure 10:
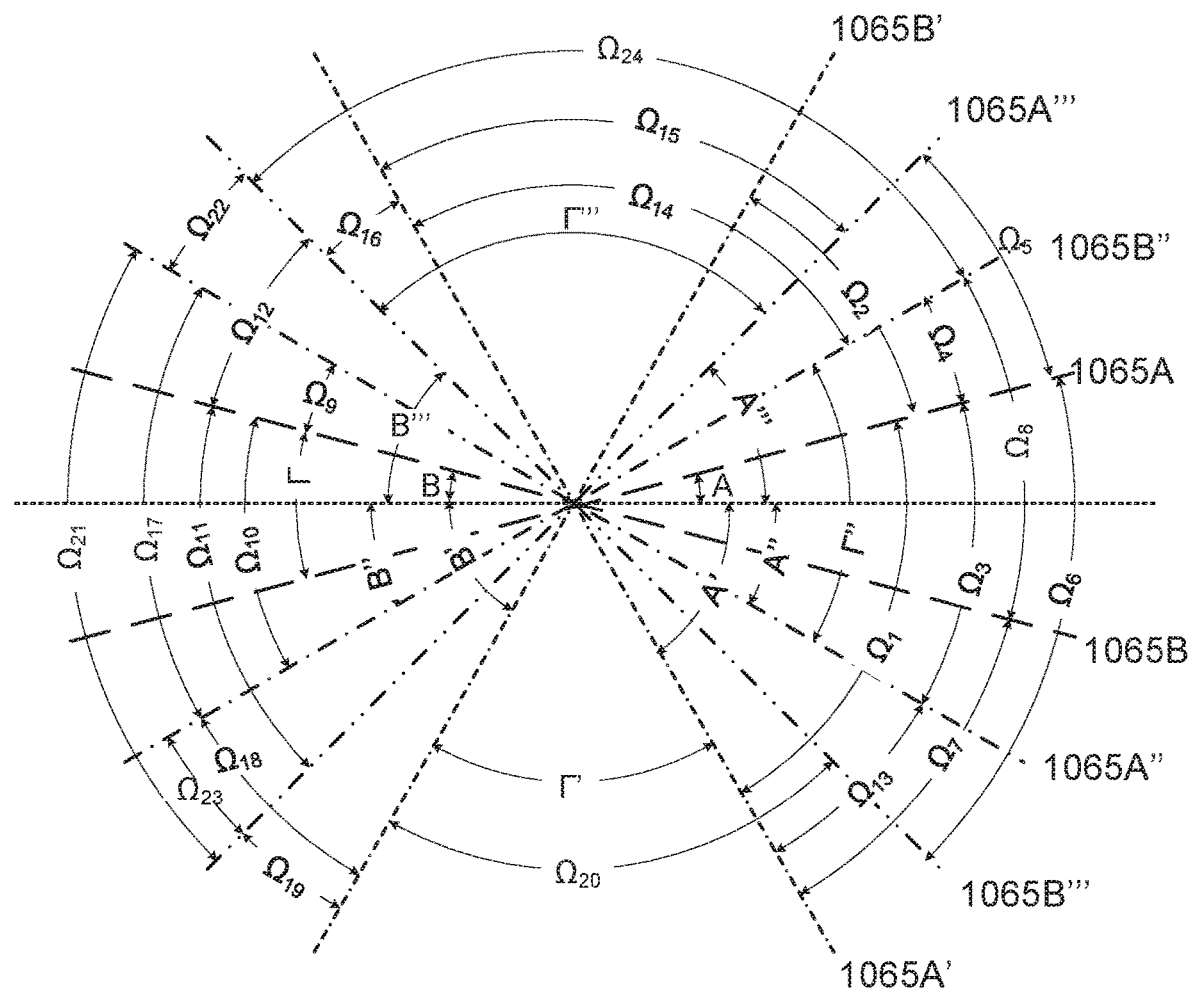
FIG. 10 illustrates the angles between the elongated teeth of the color filters of the color module of the light fixture illustrated in FIG. 7.

FIG. 10 illustrates the angles between the elongated teeth of the different color filters illustrated in in FIG. 9A-9D. The lines illustrates the inclinations of the elongated teeth of the color filters illustrated in FIG. 9A-9D and serve to illustrates the differences in inclination and the angles between the different elongated teeth of the color filters. Where:

dotted line 1007 illustrates the direction of movement of the color filters:
dashed line 1065A illustrates the inclination of the elongated teeth of color filter 703A;
dashed line 1065B illustrates the inclination of the elongated teeth of color filter 703B;
dashed-dashed-dotted line 1065A' illustrates the inclination of the elongated teeth of color filter 703A';
dashed-dashed-dotted line 1065B' illustrates the inclination of the elongated teeth of color filter 703B';
dashed-dotted line 1065A'' illustrates the inclination of the elongated teeth of color filter 703A'';
dashed-dotted line 1065B'' illustrates the inclination of the elongated teeth of color filter 703B'';
dashed-dotted-dotted line 1065A''' illustrates the inclination of the elongated teeth of color filter 703A''';
dashed-dotted-dotted line 1065B''' illustrates the inclination of the elongated teeth of color filter 703B'''.

The angles of the elongated teeth of the color filters illustrated in FIG. 9a-9D are summarized in table 1.

TABLE 1

The angles of the elongated teeth color filters in relation to the direction of movement.

| Inclination reference | Angle reference | Angle size | inclination |
|---|---|---|---|
| 1065A | A | 15° | Positive |
| 1065B | B | 15° | Negative |
| 1065A' | A' | 60° | Negative |
| 1065B' | B' | 60° | positive |
| 1065A'' | A'' | 30° | Negative |
| 1065B'' | B'' | 30° | Positive |
| 1065A''' | A''' | 45° | Positive |
| 1065B''' | B''' | 45° | Negative |

The angles between the elongated teeth of the first and second color filter of the same color filter pair is illustrated as angles Γ, Γ', Γ'', and Γ'''. Γ illustrates the angle between the elongated teeth of the color filters of the first filter pair. Γ' illustrates the angle between the elongated teeth of color filter of the second filter pair. Γ'' illustrates the angle between the elongated teeth of the color filters of the third filter pair. Γ''' illustrates the angle between the elongated teeth of the color filters of the fourth filter pair.

The angles between the elongated teeth of different color filters from different color filter pairs are illustrated as angles $\Omega_1$-$\Omega_{24}$.

Table 2 summarizes the size of the angles Γ, Γ', Γ'', Γ''' and $\Omega_1$-$\Omega_{24}$.

TABLE 2

Angles between elongated teeth of different color filters

|  |  | Inclination reference | | | | | | |
|---|---|---|---|---|---|---|---|---|
|  |  | 1065B | 1065A' | 1065B' | 1065A'' | 1065B'' | 1065A''' | 1065B''' |
| Inclination reference | 1065A | Γ = 30° | $\Omega_1$ = 75° | $\Omega_2$ = 45° | $\Omega_3$ = 45° | $\Omega_4$ = 15° | $\Omega_5$ = 30° | $\Omega_6$ = 60° |
|  | 1065B |  | $\Omega_7$ = 45° | $\Omega_8$ = 90° | $\Omega_9$ = 15° | $\Omega_{10}$ = 45° | $\Omega_{11}$ = 60° | $\Omega_{12}$ = 30° |
|  | 1065A' |  |  | Γ' = 60° | $\Omega_{13}$ = 30° | $\Omega_{14}$ = 90° | $\Omega_{15}$ = 75° | $\Omega_{16}$ = 15° |
|  | 1065B' |  |  |  | $\Omega_{17}$ = 90° | $\Omega_{18}$ = 30° | $\Omega_{19}$ = 15° | $\Omega_{20}$ = 75° |
|  | 1065A'' |  |  |  |  | Γ'' = 60° | $\Omega_{21}$ = 75° | $\Omega_{22}$ = 15° |
|  | 1065B'' |  |  |  |  |  | $\Omega_{23}$ = 15° | $\Omega_{24}$ = 75° |
|  | 1065A''' |  |  |  |  |  |  | Γ'''' = 90° |

The minimum angle between the elongated teeth of the different color filters of the color filter module shown in FIGS. 8A and 8B is 15 degrees and the angles between the elongated teeth of different filter pairs are at least 15 degrees. Additionally the angle between the elongated teeth of the color filters of the same color filter is as least 30 degrees.

It is noted that the color filters can have any filtering characteristics in order to provide a desired filtering effect. In color filter module 745 illustrated in FIGS. 7 to 10 the color filters 703A and 703B of the first color filter pair is provided as a cyan color filter allowing light in the cyan region of the spectrum to pass through while blocking other parts of the visible optical spectrum. The color filters 703A' and 703B' of the second color filter pair is provided as a magenta color filter allowing light in the magenta region of the spectrum to pass through while blocking other parts of the visible optical spectrum. The color filters 703A'' and 703B'' of the third color filter pair is provided as yellow color filters allowing light in the yellow region of the spectrum to pass through while blocking other parts of the visible optical spectrum. The color filters 703A''' and 703B''' of the fourth color filter pair are provided as color temperature correction (CTC) filters having a predefined filtering characteristic which is suitable for adjusting the color temperature of the light emitted by the light source. For instance a cold CTC filter decreasing the color temperature of the light or a warm CTC increasing the color temperature of the light. Typically a cyan filter is provided as a low pass filter allowing light with wavelengths below 550 nm to pass, a magenta filter is provided as a band stop filter blocking light having wavelengths between 450 nm to 650 nm and a yellow filter is provided as a high pass filter allowing light with wave lengths above 550 nm to pass. The skilled person realizes that the wavelength limits described above can vary depending on set up and desired filtering characteristics. Also the filters can be provided as filters having other filtering characterizes for instance blue, red, green, amber, etc. filtering characteristic.

It is noticed that the order of the color filter pairs may be changed for instance in one embodiment the color filter pairs illustrated in FIGS. 9A-9D may be arranged in the following order from the light source:
1. The second color filter pair illustrated in FIG. 9B;
2. The first color filter pair illustrated in FIG. 9A;
3. The third color filter pair illustrated in FIG. 9C;
4. The forth color filter pair illustrated in FIG. 9D;

This order results in the fact that the inclination of the elongated teeth of adjacent color filter pairs along the optical axis and the light beam are opposite, meaning the inclination of the teeth adjacent color filter pairs are respectively negative and positive in relation to the direction of movement. If the color filter pairs of FIG. 9A-9D are arranged in the order described above, the first color filters of the color filter pairs will have positive, negative, positive and negative inclination along the light beam and the second color filter of the color filter pairs will have negative, positive, negative and positive inclination along the light beam. Moiré effect occurs often between adjacent color filters as adjacent color filters are arranged in approximately the same focal plane along the optical axis. Such Moiré effect can be reduced by providing adjacent color filters with opposite inclinations as then the angle between adjacent elongated teeth are larger.

It is noticed that the illustrated embodiments serve to illustrate the principles of the present invention and that many embodiments within the scope of the claims can be provided. For instance, the pattern of the various color filters can be provided with different angles of the elongated teeth than illustrated in the figures. The filtering filter characteristics of the illustrated embodiments may differ from the relation to the examples provided. The number of color filter pairs of the illustrated light fixtures may also vary from the illustrated embodiments.

What is claimed is:

1. A filter assembly for a light fixture, the assembly comprising at least one actuator, a color filter pair comprising two color filters, wherein said color filters are linearly moveable relative to each other in substantially parallel planes by the at least one actuator, each of said color filters comprises a color filtering region formed as a comb-like structure comprising a plurality of elongated teeth, wherein the plurality of elongated teeth of said color filters are angled in relation to the direction of movement of said color filters, the angle between said elongated teeth of the same color filter is less than 10 degrees, and said elongated teeth of said two color filters are non-parallel in relation to each other.

2. The filter assembly according to claim 1, wherein said color filters are linearly moveable towards each other.

3. The filter assembly according to claim 1, wherein the angles between said elongated teeth of said two color filters are at least 10 degrees.

4. The filter assembly according to claim 1, wherein the width of at least sonic of said elongated teeth increases towards a bottom of said elongated teeth.

5. The filter assembly according to claim 1, wherein the color filter region of said two color filters have the same filtering characteristics.

6. The filter assembly according to claim 1, wherein said two color filters comprise dichroic filters.

7. The filter assembly according to claim 1, wherein the tips of at least some of the teeth of each of said two color filters form a curved edge.

8. A light fixture comprising at least one light source generating a light beam, a first color filter pair of a first filter assembly that can be linearly inserted into the light beam, wherein the first color filter pair comprises two color filters, wherein said color filters are linearly moveable relative to each other in substantially parallel planes by at least one actuator, each of said color filters comprises a color filtering region formed as a comb-like structure comprising a plural of elongated teeth, wherein the plurality of elongated teeth of said color filters are angled in relation to the direction of movement of said color filters, the angle between said elongated teeth of the same color filter is less than 10 degrees, and said elongated teeth of said two color filters are non-parallel in relation to each other.

9. The light fixture according to claim 8, wherein said color filters are linearly moveable towards each other.

10. The light fixture according to claim 8, wherein the angles between said elongated teeth of said two color filters are at least 10 degrees.

11. The light fixture according to claim 8, wherein the width of at least some of said elongated. teeth increases towards a bottom of said elongated teeth.

12. The light fixture according to claim 8, wherein the color filter region of said two color filters have the same filtering characteristics.

13. The light fixture according to claim 8, wherein said two color filters comprise dichroic filters.

14. The light fixture according to claim 8, wherein the tips of at least some of the teeth of each of said two color filters form a curved edge.

15. The light fixture according to claim 8, further comprising a second color filter pair of a second filter assembly which can be linearly inserted into the light beam, wherein said second color filter pair comprises two color filters, wherein said color filters are linearly moveable relative to each other in substantially parallel planes by at least one actuator, each of said color filters comprises a color filtering region formed as a comb-like structure comprising a plurality of elongated teeth, wherein the plurality of elongated teeth of said color filters are angled in relation to the direction of movement of said color filters, the angle between said elongated teeth of the same color filter is less than 10 degrees, and said elongated teeth of said two color filters are non-parallel in relation to each other.

16. The light fixture according to claim 15, wherein said elongated teeth of said color filters of said first color filter pair of the first filter assembly and said elongated teeth of said color filters of said second color filter pair of the second filter assembly are non-parallel in relation to each other.

17. The light fixture according to claim 16, wherein the angles between said elongated teeth of said first color filter pair and said elongated teeth of said second color filter pair are at least 10 degrees.

18. The light fixture according to claim 16, wherein the angles between said elongated teeth of said first color filter pair and said elongated teeth of said second color filter pair are at least 15 degrees.

19. The light fixture according to claim 16, wherein a first color filter of said first color filter pair and a first color filter of said second color filter pair are arranged adjacent to each other along said light beam, and the inclination of said elongated teeth of said first color filter of said first color filter pair and the inclination of said elongated teeth of said second color filter pair are opposite.

* * * * *